United States Patent
Iyer et al.

(10) Patent No.: US 10,549,662 B2
(45) Date of Patent: Feb. 4, 2020

(54) CLIMATE CONTROL SYSTEM AND METHOD FOR HEATING AND COOLING A SEAT OF A VEHICLE BASED ON AN OCCUPANT PRESSURE DISTRIBUTION, AND A METHOD OF MANUFACTURING A SEAT CLIMATE CONTROL SYSTEM

(71) Applicant: GM Global Technology Operations LLC, Detroit, MI (US)

(72) Inventors: Anand V. Iyer, Karnataka (IN); Brennon L. White, Novi, MI (US); Bruce L. Stone, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 363 days.

(21) Appl. No.: 15/388,652

(22) Filed: Dec. 22, 2016

(65) Prior Publication Data

US 2018/0178693 A1 Jun. 28, 2018

(51) Int. Cl.
| | |
|---|---|
| *B60N 2/56* | (2006.01) |
| *B60N 2/00* | (2006.01) |
| *H05B 1/02* | (2006.01) |
| *F25B 21/04* | (2006.01) |

(52) U.S. Cl.
CPC .......... *B60N 2/5685* (2013.01); *B60N 2/002* (2013.01); *H05B 1/0238* (2013.01); *B60N 2/565* (2013.01); *B60N 2/5692* (2013.01); *F25B 21/04* (2013.01); *F25B 2321/0212* (2013.01); *H05B 2203/029* (2013.01)

(58) Field of Classification Search
CPC ............ F25B 2321/0212; F25B 21/04; H05B 1/0238; H05B 2203/029; B60N 2/5685; B60N 2/002; B60N 2/565; B60N 2/5692
See application file for complete search history.

(56) References Cited

U.S. PATENT DOCUMENTS

| | | | | |
|---|---|---|---|---|
| 5,626,021 A | * | 5/1997 | Karunasiri | A47C 7/74 236/49.3 |
| 6,892,807 B2 | * | 5/2005 | Fristedt | B60H 1/00285 165/202 |
| 7,610,767 B2 | * | 11/2009 | Kadle | B60H 1/00285 62/186 |
| 9,789,796 B1 | * | 10/2017 | White | B60N 2/565 |
| 2012/0245491 A1 | * | 9/2012 | Amell | A61B 5/6893 600/595 |
| 2013/0206852 A1 | * | 8/2013 | Brykalski | F24D 19/1096 237/2 A |

(Continued)

*Primary Examiner* — Frantz F Jules
*Assistant Examiner* — Lionel Nouketcha

(57) ABSTRACT

A system includes a climate control module and a thermal device control module. The climate control module, based on at least one of a user input and a first input from a temperature sensor that measures a temperature of a seat of a vehicle, generates one of (i) a heating command signal indicating an instruction to heat the seat and (ii) a cooling command signal indicating an instruction to cool the seat. The thermal device control module, in response to one of the heating command signal and the cooling command signal, controls at least one of a blower and at least one TED to one of heat and cool the seat based on a second input from at least one sensor that measures at least one of a pressure applied to the seat, a force applied to the seat, and a strain within the seat.

24 Claims, 22 Drawing Sheets

(56) References Cited

U.S. PATENT DOCUMENTS

| | | | |
|---|---|---|---|
| 2014/0026320 A1* | 1/2014 | Marquette | A47C 21/044 5/423 |
| 2015/0048658 A1* | 2/2015 | Gawade | B60N 2/5678 297/180.12 |
| 2015/0274049 A1* | 10/2015 | Langensiepen | B60N 2/5628 297/180.12 |

* cited by examiner

US 10,549,662 B2

CLIMATE CONTROL SYSTEM AND METHOD FOR HEATING AND COOLING A SEAT OF A VEHICLE BASED ON AN OCCUPANT PRESSURE DISTRIBUTION, AND A METHOD OF MANUFACTURING A SEAT CLIMATE CONTROL SYSTEM

FIELD

The present disclosure relates to climate control systems for heating and cooling a seat of a vehicle based on an occupant pressure distribution, and a method of manufacturing a seat climate control system.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some vehicles are equipped with climate control systems for heating or cooling seats. Climate control systems generally include a blower and a plurality of thermoelectric devices (TEDs) located in a seat cushion. The TEDs generate a temperature difference between one side of the seat cushion and an opposite side of the seat cushion when current is supplied to the TEDs. Reversing the polarity of current supplied to the TEDs changes the direction of heat transfer. Thus, the TEDs are operable to heat or cool an occupant sitting in the seat cushion. The blower forces air through the seat cushion to provide additional cooling. In addition, the airflow generated by the blower cools the TEDs.

Climate control systems typically heat or cool a vehicle seat based on an occupant input. In one example, an occupant presses a button to select low, medium, or high heating or cooling level. The climate control system supplies a first, second, or third amount of current to the TEDs in response to the occupant selecting the low, medium, or high heating or cooling level, respectively. The second amount of current is greater than the first amount of current, and the third amount of current is greater than the second amount of current.

SUMMARY

A system according to the present disclosure includes a climate control module and a thermal device control module. The climate control module, based on at least one of a user input and a first input from a temperature sensor that measures a temperature of a seat of a vehicle, generates one of (i) a heating command signal indicating an instruction to heat the seat and (ii) a cooling command signal indicating an instruction to cool the seat. The thermal device control module, in response to one of the heating command signal and the cooling command signal, controls at least one of a blower and at least one TED to one of heat and cool the seat based on a second input from at least one sensor that measures at least one of a pressure applied to the seat, a force applied to the seat, and a strain within the seat.

A method according to the present disclosure includes, based on at least one of a user input and a first input from a temperature sensor that measures a temperature of a seat of a vehicle, generating one of (i) a heating command signal indicating an instruction to heat the seat and (ii) a cooling command signal indicating an instruction to cool the seat. The method also includes, in response to one of the heating command signal and the cooling command signal, controlling at least one of a blower and at least one TED to one of heat and cool the seat based on a second input from at least one sensor that measures at least one of a pressure applied to the seat, a force applied to the seat, and a strain within the seat.

A climate control system for a seat of a vehicle according to the present disclosure includes at least one TED and at least one sensor. The at least one TED, when supplied with a voltage, is configured to generate a difference between a first temperature of a first side of the seat and a second temperature of a second side of the seat. The at least one sensor is configured to measure at least one of a pressure applied to the seat, a force applied to the seat, and a strain within the seat.

A method of manufacturing a climate control system for a seat of a vehicle according to the present disclosure includes printing a first circuit and printing an insulating body onto the first circuit while leaving at least a portion of the first circuit uncovered by the insulating body. The insulating body has a first surface disposed on the first circuit and a second surface opposite of the first surface, and the insulating body defines at least one insulating pocket. The method further includes inserting at least one TED into the at least one insulating pocket. The at least one TED has a first side and a second side opposite of the first side. The method further includes placing the first side of at least one TED onto the uncovered portion of the first circuit to electrically connect the first side the at least one TED and the first circuit to each other, and printing a second circuit onto the second side of the at least one TED to electrically connect the second side of the at least one TED and the second circuit to each other.

In one aspect, the method further includes placing a first conductive adhesive on the uncovered portion of the first circuit before placing the first side of the at least one TED onto the uncovered portion of the first circuit, and placing a second conductive adhesive on the second side of the at least one TED before printing the second circuit onto the second side of the at least one TED.

In another aspect, the at least one insulating pocket includes a plurality of insulating pockets and the at least one TED includes a plurality of TEDs, and the method further includes inserting each of the plurality of TEDs into one of the plurality of insulating pockets.

In another aspect, the method further includes inserting at least one sensor into one of the plurality of insulating pockets. The at least one sensor has a first side and a second side opposite of the first side, and the at least one sensor is configured to measure at least one of a pressure applied to the seat, a force applied to the seat, and a strain within the seat. In this aspect, the method further includes placing a first side of the at least one sensor onto the uncovered portion of the first circuit to electrically connect the first side of the sensor and the first circuit, and printing the second circuit on the second side of the at least one sensor to electrically connect the second side of the sensor and the second circuit.

In another aspect, the method further includes printing an airflow chamber, printing the first circuit onto the airflow chamber, forming an air flow channel between adjacent portions of the insulating body that define the plurality of insulating pockets when printing the insulating body, and printing an insulating layer over the second circuit and the plurality of insulating pockets.

Another method of manufacturing a climate control system for a seat of a vehicle according to the present disclosure includes printing a first circuit and placing a first side of at least one TED onto the first circuit to electrically connect the first side the at least one TED and the first circuit to each other. The method further includes printing a second circuit and placing the second circuit onto a second side of the at least one TED opposite of the first side to electrically connect the second side of the at least one TED and the second circuit to each other. The method further includes placing the first circuit, the at least one TED, and the second circuit into a mold, and pouring an insulating material into the mold and around the first circuit, the at least one TED, and the second circuit to form an insulating body defining at least one insulating pocket that encloses the at least one TED.

In another aspect, the method further includes bonding the first side of the at least one TED to the first circuit using a first conductive adhesive, and bonding the second side of the at least one TED to the second circuit using a second conductive adhesive. The first circuit, the at least one TED, and the second circuit are placed into the mold after the first and second sides of the at least one TED are bonded to the first and second circuits.

In another aspect, at least one insulating pocket includes a plurality of insulating pockets and the at least one TED includes a plurality of TEDs.

In another aspect, the method further includes inserting at least one sensor into one of the plurality of insulating pockets. The at least one sensor has a first side and a second side opposite of the first side, and the at least one sensor is configured to measure at least one of a pressure applied to the seat, a force applied to the seat, and a strain within the seat. In this aspect, the method further includes bonding the first side of the at least one sensor to the first circuit using the first conductive adhesive to electrically connect the first side of the sensor and the first circuit, and bonding the second side of the at least one sensor to the second circuit using the second conductive adhesive to electrically connect the second side of the sensor and the second circuit.

In another aspect, the method includes inserting each of the plurality of TEDs into separate chambers in the mold to form discrete portions of the insulating body that define the plurality of insulating pockets with air flow channels disposed between the portions of the insulating body, printing an airflow chamber, and bonding the airflow chamber to a first surface of the insulating body using at least one of thermal welding, ultrasonic welding, and radio frequency welding.

Another method of manufacturing a climate control system for a seat of a vehicle according to the present disclosure includes placing a first side of at least one TED onto a first circuit to electrically connect the first side the at least one TED and the first circuit to each other. The method further includes placing a first side of at least one sensor onto the first circuit to electrically connect the first side of the at least one sensor and the first circuit to each other. The at least one sensor is configured to measure at least one of a pressure applied to the seat, a force applied to the seat, and a strain within the seat. The method also includes placing a second circuit onto a second side of the at least one TED opposite of the first side of the at least one TED to electrically connect the second side of the at least one TED and the second circuit to each other. The method further includes placing the second circuit onto a second side of the at least one sensor opposite of the first side of the at least one sensor to electrically connect the second side of the at least one sensor and the second circuit to each other.

In another aspect, the method includes inserting the at least one TED and the at least one sensor into a plurality of insulating pockets defined by portions of an insulating body. The insulating body has a first surface and a second surface opposite of the first surface. In this aspect, the method further includes bonding a first insulating cover to the first surface of the insulating body using at least one of thermal welding, ultrasonic welding, and radio frequency welding, and bonding a second insulating cover to the second surface of the insulating body using at least one of thermal welding, ultrasonic welding, and radio frequency welding.

In another aspect, the method further includes spacing the portions of the insulating body apart from each other when boding the first and second insulating covers to the first and second surfaces of the insulating body to form air flow channels between the portions of the insulating body, and bonding an airflow chamber to the first insulating cover using at least one of thermal welding, ultrasonic welding, and radio frequency welding.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
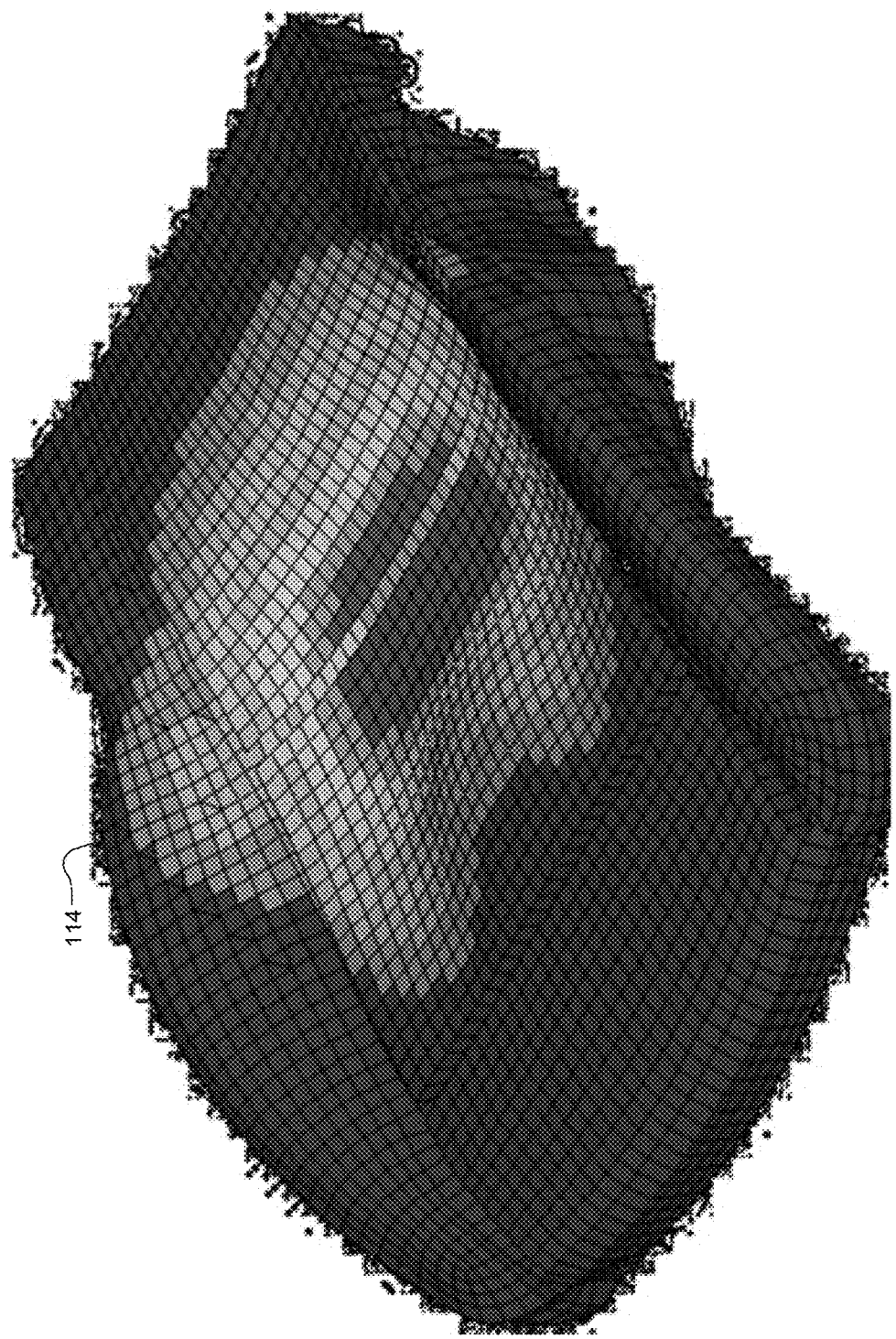
FIG. 1 is a perspective view of an example seat cushion according to the principles of the present disclosure.

As discussed above, some climate control systems adjust the amount current supplied to thermoelectric devices (TEDs) disposed within a seat cushion based on a heating or cooling level that is selected by an occupant. Other climate control systems adjust the amount current supplied to the TEDs based on a target seat temperature that is selected by an occupant. In one example, the climate control systems adjust the amount of current supplied to the TEDs in an open-loop manner based on a predetermined relationship between the target seat temperature and a target amount of current to be supplied to the TEDs. In another example, the climate control systems adjust the amount of current supplied to the TEDs in a closed-loop manner to minimize the difference between a seat temperature measured by a temperature sensor in the seat cushion and the target seat temperature.

Regardless of whether the current supplied to the TEDs based on a heating or cooling level or a target seat temperature, the TEDs may heat or cool different occupants by different amounts depending on various characteristics of the occupant. For example, body temperature may vary from one occupant to another occupant by about 4 degrees Celsius (° C.) to 6° C. for a given target seat temperature. The characteristics of the occupant that cause this variation include the mass of the occupant and the occupied seat area.

Larger mass occupants generally require a greater heat flux than smaller mass occupants to reach the same body temperature. However, occupant weight also affects seat compression, which affects the distance for heat to transfer between the TEDs and the occupant through the seat cushion. For example, a lighter occupant compresses a seat cushion less than a heavier occupant, resulting in a longer heat transfer distance and a higher power requirement to reach the same body heat as a heavier occupant. Passengers who occupy a smaller area of a seat cushion also require less heat than larger occupants because area is indirectly proportional to heat flux.

Climate control systems typically supply the same amount of power to all of the thermoelectric devices (TEDs) disposed within a seat cushion regardless of the amount of pressure applied to the seat cushion by the occupant at the location of each TED. However, the pressure applied to seat cushion by the occupant may vary depending on the location of each TED, and the thickness of the seat cushion at a particular location is inversely proportional to the pressure applied to the seat cushion at that location. As the thickness of the seat cushion decreases, heat is transferred between the TEDS and the occupant at a greater rate. Thus, the amount of heating or cooling provided by a particular TED may be greater than or less than desired depending on the pressure applied to the seat cushion at the location of the TED.

In addition, the amount of pressure applied to the seat cushion by the occupant may be zero or near zero at the locations of some of the TEDs if the occupant is not pressing on the seat cushion at these locations. Since the occupant is not contacting the seat at these locations, the amount of heat that is transferred between the TEDs and the occupant at these locations is minimal. Thus, supplying power to the TEDs at these locations reduces the efficiency of the climate control system.

A climate control system according to the present disclosure includes one or more sensors that measure a pressure or force applied to a seat, or a strain within the seat, and control the amount of current supplied to the TEDs based on inputs from the sensors. In one example, each TED is disposed between at least two of the sensors, and the amount of current supplied to each TED is adjusted based on the inputs from the sensors between which the TED is disposed. In another example, if the pressure, force, or strain level measured by the sensors is less than a threshold, the amount of current supplied the TED is set to zero. If the pressure, force, or strain level measured by the sensors is greater than the threshold, the amount of current supplied to the TED is inversely proportional to the pressure, force, or strain level measured by the sensors. In addition, the pressure, force, or strain level at other locations in the seat are considered when determining how much to adjust the amount of current supplied to the TED in proportion to the pressure, force, or strain level at the location of the TED.

Adjusting the amount of current supplied to the TEDs based on the pressure, force, or strain levels measured by sensors located adjacent to the TEDs enables the climate control system to provide the desired amount of heating or cooling to the occupant. In addition, adjusting the amount of current supplied to the TEDs in this way enables the climate control system to achieve a uniform temperature across the entire top surface of a seat cushion or a seat back. Further, by setting the current supplied to some of the TEDs to zero when the pressure, force, or strain level adjacent to the TEDs is less than a threshold, the efficiency of the climate control system is improved.

Referring to FIG. 1, a seat cushion 110 for a seat of a vehicle is provided. The seat cushion 110 includes a contact surface 114 adapted to support a body of an occupant. The occupant generates a non-uniform pressure distribution on the seat cushion 110. Pressure regions vary from one occupant to another occupant depending on the occupant's size or shape. Pressure regions may also be affected by other objects engaged with the seat cushion 110. For example, a high pressure region may be located in an area where an object in the occupant's pocket is disposed between the occupant and the seat cushion.

Figure 2:
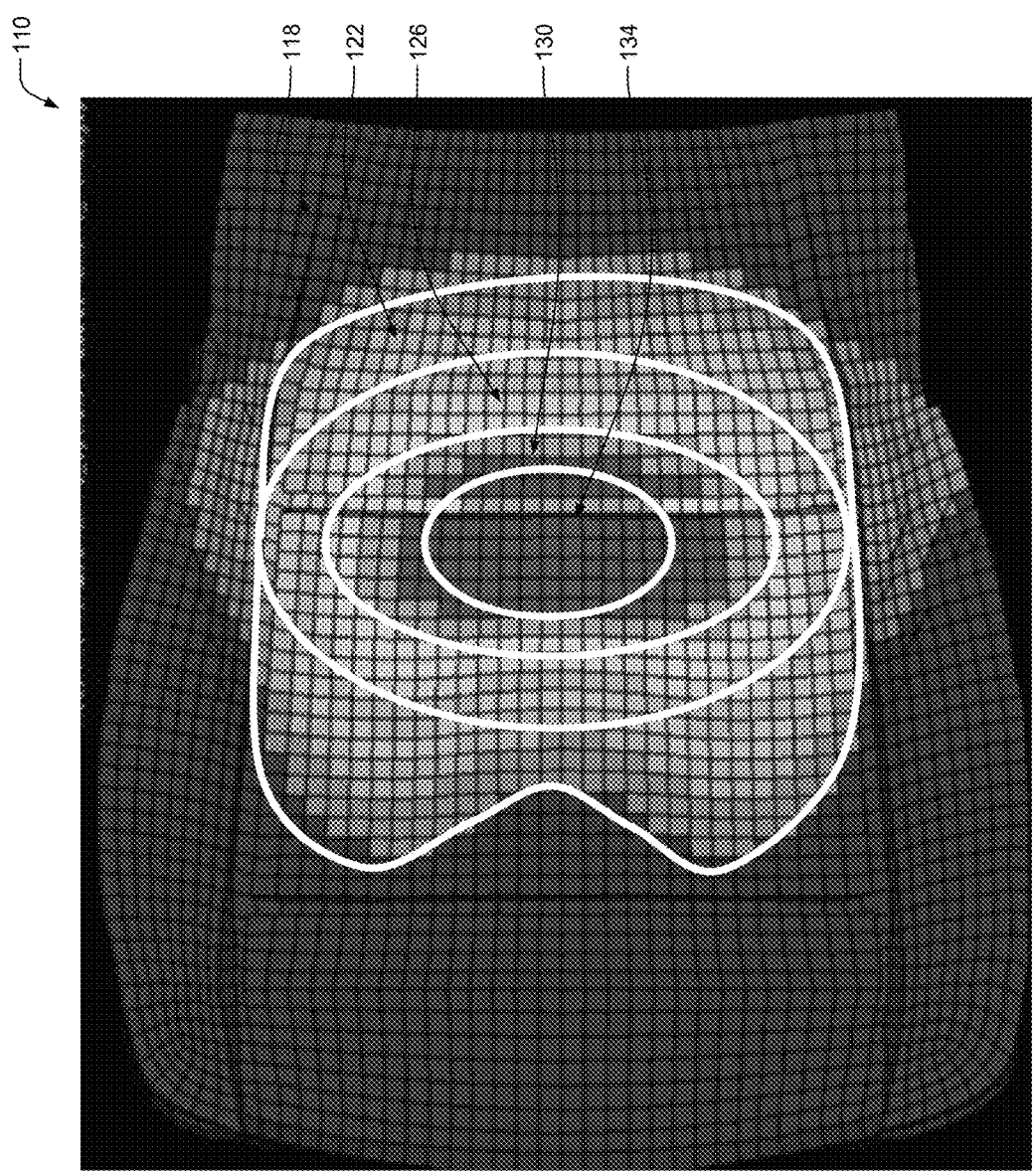
FIG. 2 is another perspective view of the seat cushion of FIG. 1 and a schematic view of example pressure zones of the seat cushion.

With reference to FIG. 2, an example pressure distribution resulting from the occupant sitting on the seat cushion 110 is illustrated. An unoccupied outer portion of the seat defines a zero pressure or null region 118. A first or lowest pressure region 122 is adjacent to the null region 118. A second pressure region 126 having a higher pressure than the first pressure region 122 is disposed radially inward of the first pressure region 122. A third pressure region 130 having a higher pressure than the second pressure region 126 is disposed radially inward of the second pressure region 126. A fourth or highest pressure region 134 is disposed radially inward of the third pressure region 130 and is at or near a center of the seat cushion 110.

An example climate control system according to the present disclosure does not supply power to TEDs located in the zero pressure region 118. In addition, the system supplies first, second, third, and fourth power levels to TEDs in the first, second, third and fourth pressure regions 122, 126, 130, and 134, respectively. The magnitude of power supplied to TEDs in the pressure regions 122, 126, 130, and 134 is inversely related to the pressure levels in each of those regions. Thus, the second power level is greater than the first power level, the third power level is greater than the second power level, and the fourth power level is greater than the third power level.

Figure 3:
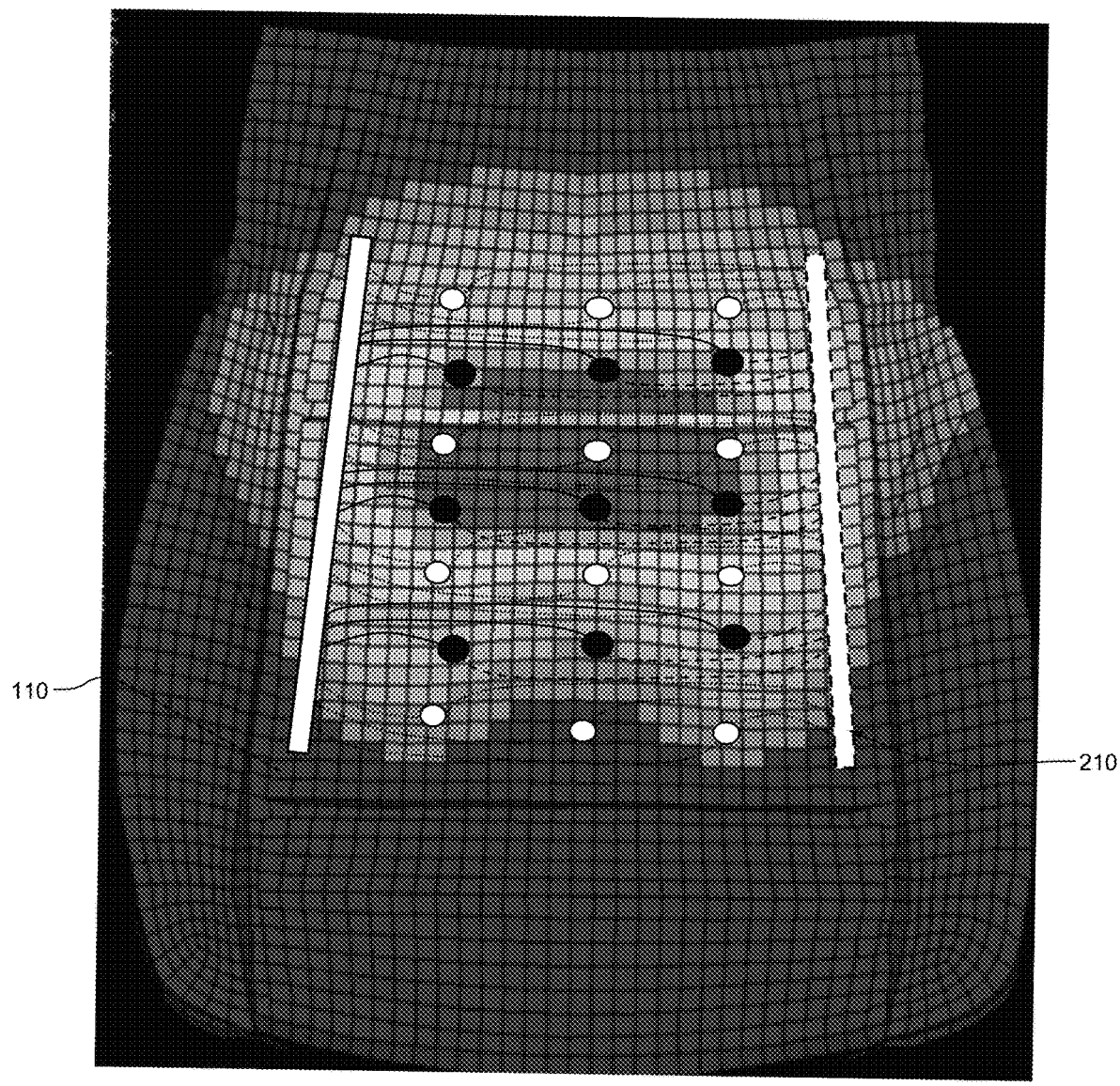
FIG. 3 is another perspective view of the seat cushion of FIG. 1 and a schematic view of a climate control system disposed within the seat cushion.
Figure 4:
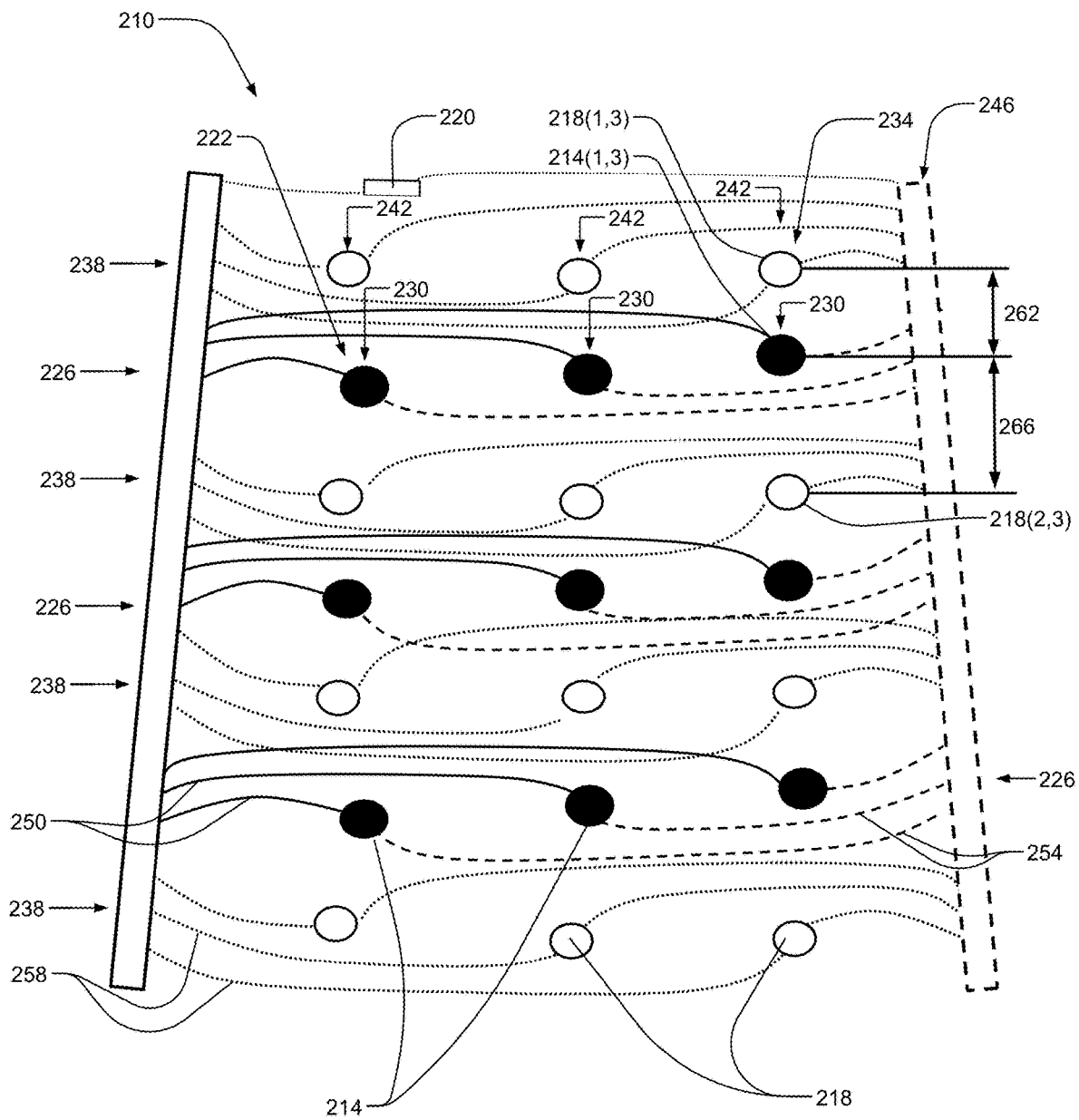
FIG. 4 is the schematic view of the climate control system of FIG. 3 shown without the seat cushion of FIG. 1.

With reference to FIGS. 3 and 4, the seat cushion 110 is heated and cooled with a climate control system 210. The climate control system 210 includes a plurality of TEDs 214, a plurality of sensors 218, and a temperature sensor 220. The sensors 218 include pressure sensors configure to measure a pressure applied to the seat cushion 110, force sensors configured to measure a force applied to the seat cushion 110, and/or strain gauges configured to measure the strain within the seat cushion 110. The TEDs 214 are arranged in a first matrix 222 having first rows 226 and first columns 230. The sensors 218 are arranged in a second matrix 234 having second rows 238 and second columns 242. Each TED 214 is disposed between at least two of the sensors 218.

The climate control system 210 also includes a circuit 246 configured to supply power to the TEDs 214. The circuit 246 is disposed within the seat cushion 110. The circuit 246 may be drawn in a sinusoidal pattern rather than straight lines to reduce the impact of stretching when a load is applied to the seat cushion 110. There may be more than one line between a power source 420 (shown in FIG. 7) and the TEDs 214 to ensure that there are multiple channels to distribute power and signals, thus increasing redundancy and improving durability to the circuits. The above arrangement also helps distribute heat transfer since the circuits to the TEDs act as heat exchangers. The lines that power the TEDs 214 should be spaced out as evenly as possible to improve heat transfer efficiency. Moreover, a circuit line with greater surface area will have better heat transfer efficiency.

The circuit 246 includes top surface wiring or upper portion 250 electrically connected to the top side of each TED 214, and bottom surface wiring or lower portion 254 electrically connected to the bottom side of each TED 214. The circuit 246 also includes upper interstitial wiring or top interstitial portion 258 electrically connected to the top side of each sensor 218 and to the top side of the temperature sensor 220. The circuit 246 also includes lower interstitial wiring or bottom interstitial portion 260 electrically connected to the bottom side of each sensor 218 and to the bottom side of the temperature sensor 220. Upper, lower, and interstitial portions 250, 254, 258, 260 refer to the position of the wires within the circuit 246 and the seat cushion 110. Thus, the upper portion 250 is disposed near the top surface of the seat cushion, the lower portion 254 is disposed near the bottom surface of the seat cushion, and the interstitial portions 258, 260 are disposed between the upper and lower portions 250, 254.

The first and second columns 230, 242 are aligned. Each TED 214 is disposed between two of the sensors 218 within the first and second columns 230, 242. In one example, a first TED 214 is disposed a first distance 262 from a first sensor 218 and a second distance 266 from a second sensor 218.

Figure 7:
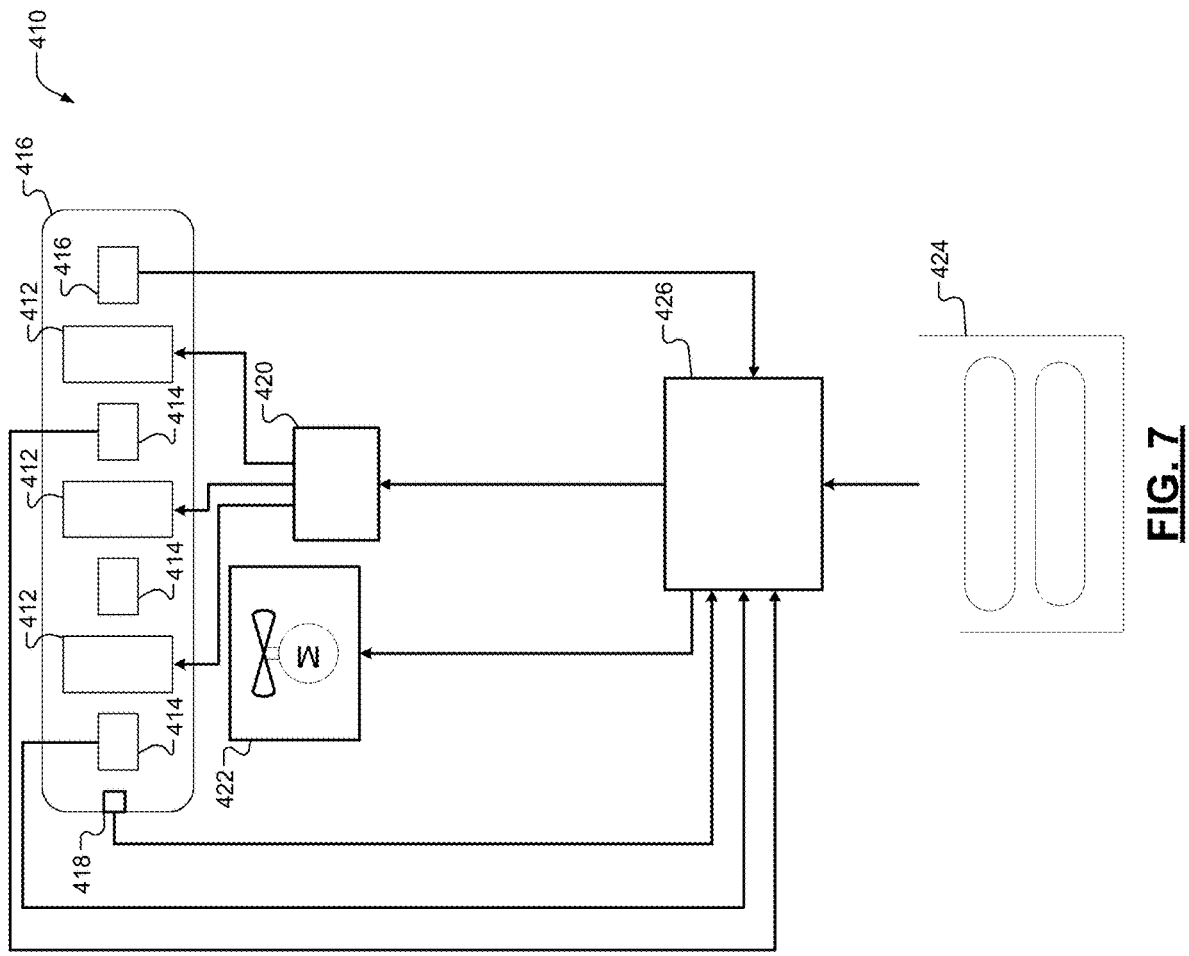
FIG. 7 is a functional block diagram of an example seat climate control system including a control module according to the principles of the present disclosure.

The climate control system 210 also includes a blower 422 (shown in FIG. 7). The blower 422 may be disposed under the seat. The blower 422 is configured to blow air past the TEDs 214 and the sensors 218. Use of the blower 414 facilitates moisture removal and cooling.

Figure 5:
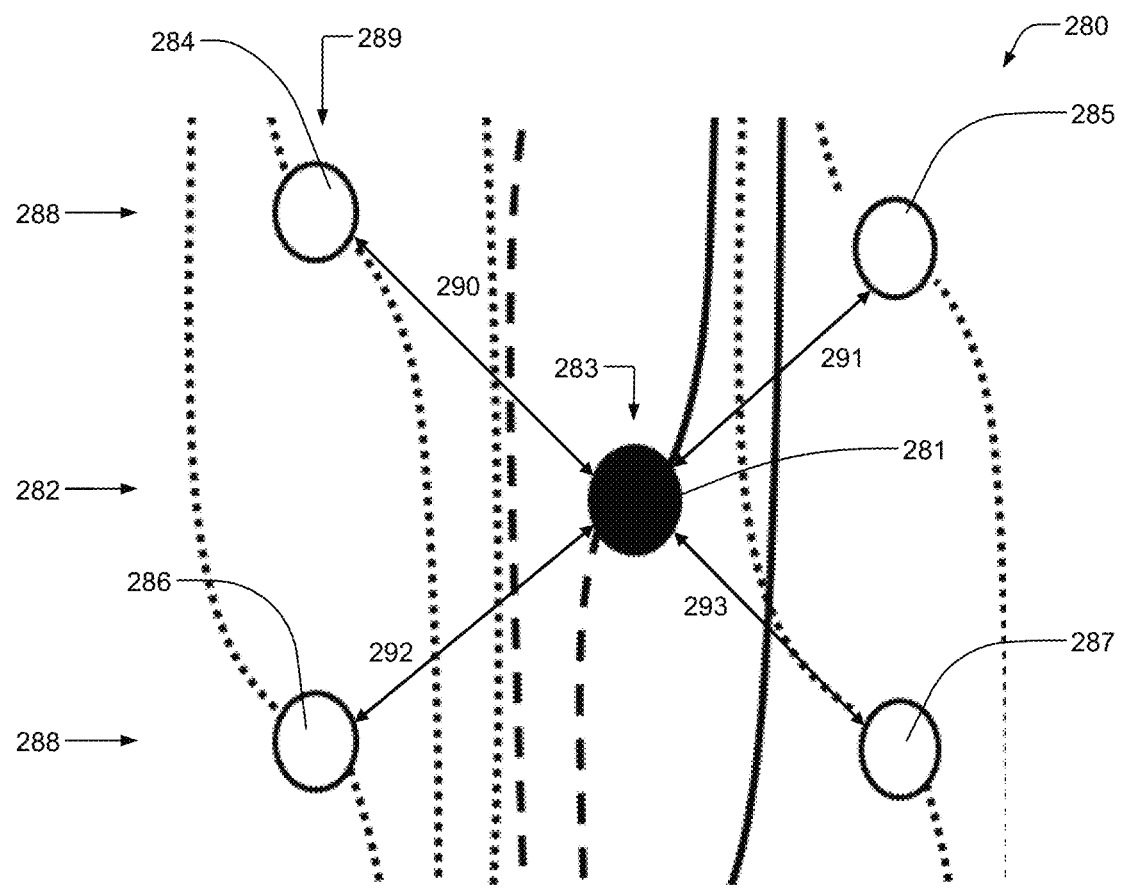
FIG. 5 is a schematic view of a portion of another example of a seat climate control system according to the principles of the present disclosure.

Referring to FIG. 5, another example climate control system 280 is provided. The climate control system 280 includes at least one TED 281 disposed in a first row 282 and a first column 283 and a plurality of sensors comprising first, second, third, and fourth sensors 284, 285, 286, 287 disposed in a matrix of second rows 288 and second columns 289. The TED 281 is disposed between first, second, third, and fourth sensors 284, 285, 286, 287. The TED 281 is a first distance 290 from the first sensor 284, a second distance 291 from the second sensor 285, a third distance 292 from the third sensor 286, and a fourth distance 293 from a fourth sensor 287.

Arrangement of TEDs and sensors is not limited to climate control systems as shown in FIGS. 4 and 5. For example, a matrix of pressure sensors could be denser so that temperature control is more sensitive to pressure distribution on the seat cushion. In another example, a climate control system includes a single TED and a single sensor. Further, a climate control system such as the climate control systems shown in FIGS. 4 and 5 may be used to heat or cool a seat cushion or a seat back.

Figure 6:
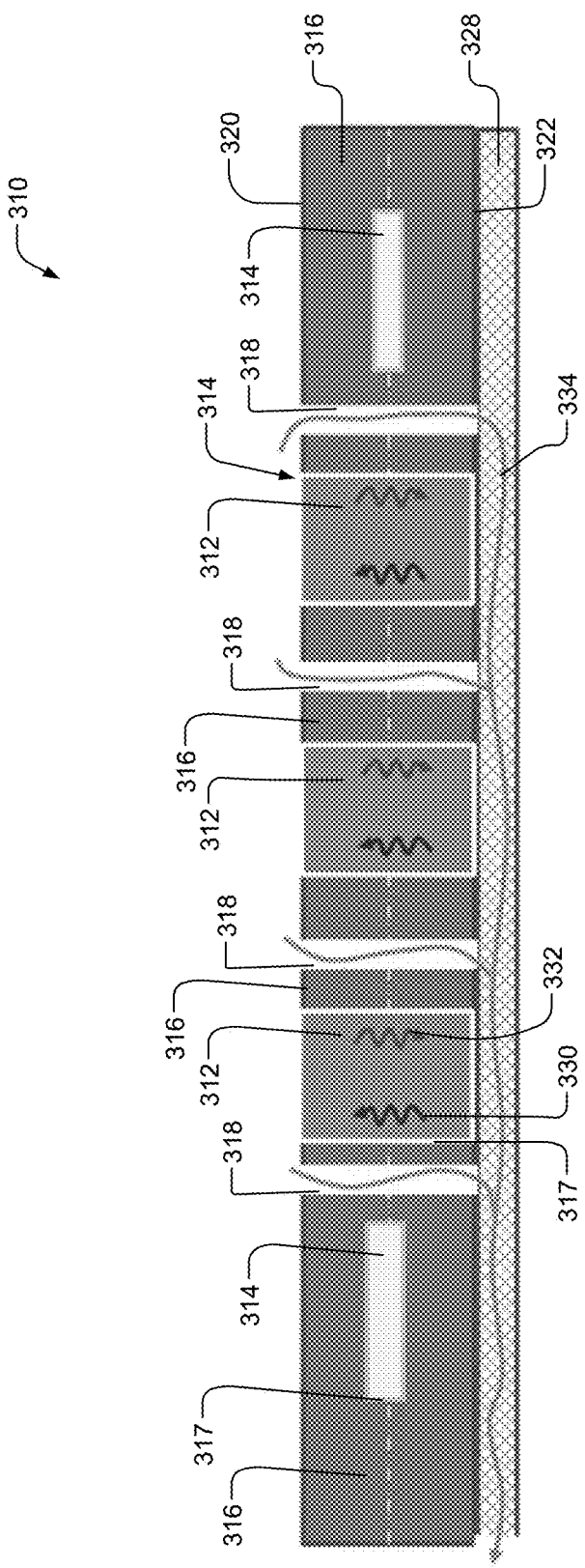
FIG. 6 is a section view of another example of a seat climate control system according to the principles of the present disclosure.

With reference to FIG. 6, an example seat climate control system 310 is shown. The seat climate control system 310 includes a plurality of TEDs 312, a plurality of sensors 314, and an insulating body 315 including discrete portions 316 that define a plurality of insulating pockets 317 which surround the TEDs 312 and the sensors 314. The sensors 314 are configured to measure the pressure applied to the seat cushion 110, the force applied to the seat cushion 110, and/or the strain within the seat cushion 110. The insulating body 315 is made of an insulating material, such as polyurethane, and the portions 316 of the insulating body 315 are separated by a plurality of perforations or airflow channels 318. The insulating body 315 has a top surface 320 and a bottom surface 322, and the airflow channels 318 extend through the top and bottom surfaces 320, 322. The climate control system 310 may also include a blower such as blower 422 (shown in FIG. 7).

Each TED 312 and each sensor 314 is disposed in a respective pocket 317. The seat climate control system 310 further includes an airflow chamber 328 attached to the bottom surface 322 of the insulating body 315. The airflow chamber 328 is porous and is made of an insulating material such as polyurethane.

The TEDs 312, when supplied with a voltage, generate a temperature difference between a top surface of the seat adjacent to the top surface 320 of the insulating body 315 and a bottom surface of the seat adjacent to the bottom surface 322 of the insulating body 315. Thus, the TEDs 324 can heat or cool the top surface of the seat. First arrows 330 depict energy flow during heating, and second arrows 332 depict energy flow during cooling. The climate control system 310 is also adapted to reduce moisture. More specifically, airflow containing moisture, indicated by a third arrow 334, is drawn through the airflow channels 318 and the airflow chamber 328 and away from an occupant seated on the top surface of the seat. A blower such as blower 422 (shown in FIG. 7) may facilitate moisture removal.

Referring to FIG. 7, a seat climate control system 410 includes a plurality of TEDs 412 and a plurality of sensors 414 disposed in an insulating body 416. The insulating body 416 may include discrete portions defining a plurality of insulating pockets such as the insulating pockets 317 shown in FIG. 6. Each TED 412 is disposed between two of the sensors 414. The sensors 414 are configured to measure a pressure applied to the seat, a force applied to the seat, and/or a strain within the seat. The TEDs 412 are configured to heat or cool a seat cushion or a seat back when supplied with a voltage.

The climate control system 410 also includes a temperature sensor 418 disposed in the insulating block 416. The temperature sensor 418 is configured to measure a temperature of the seat cushion or the seat back. The temperature sensor 418 may be a negative temperature coefficient (NTC) thermistor. A power supply 420 is electrically connected to a circuit, which in turn is connected to the TEDs 412, the sensors 414, and the temperature sensor 418. The climate control system 410 also includes a blower 422, which may be disposed under the seat cushion.

The climate control system 410 further includes a user interface device 424 such as a touchscreen or a button. The user interface device 424 allows an occupant to select climate settings for the seat. An occupant can set the user interface device 424 to heat or cool. The occupant can also set a level of heating or cooling on the user interface device 424. In other examples, an occupant may set a specific temperature for the seat cushion or back without specifying whether the system should heat or cool.

The climate control system 410 further includes a vehicle control module 426. The sensors 414, the temperature sensor 418, and the user interface device 424 are inputs to the vehicle control module 426. In response to the inputs, the vehicle control module 426 controls the blower 422 and the power supply 420, which supplies power to the TEDs 412. In various implementations, the power supply 420 may supply power to the TEDs 412 and the blower 422 independently, and the vehicle control module 426 may control the amount of power supplied to the TEDs 412 and the blower 422 by the power supply 420.

Figure 8:
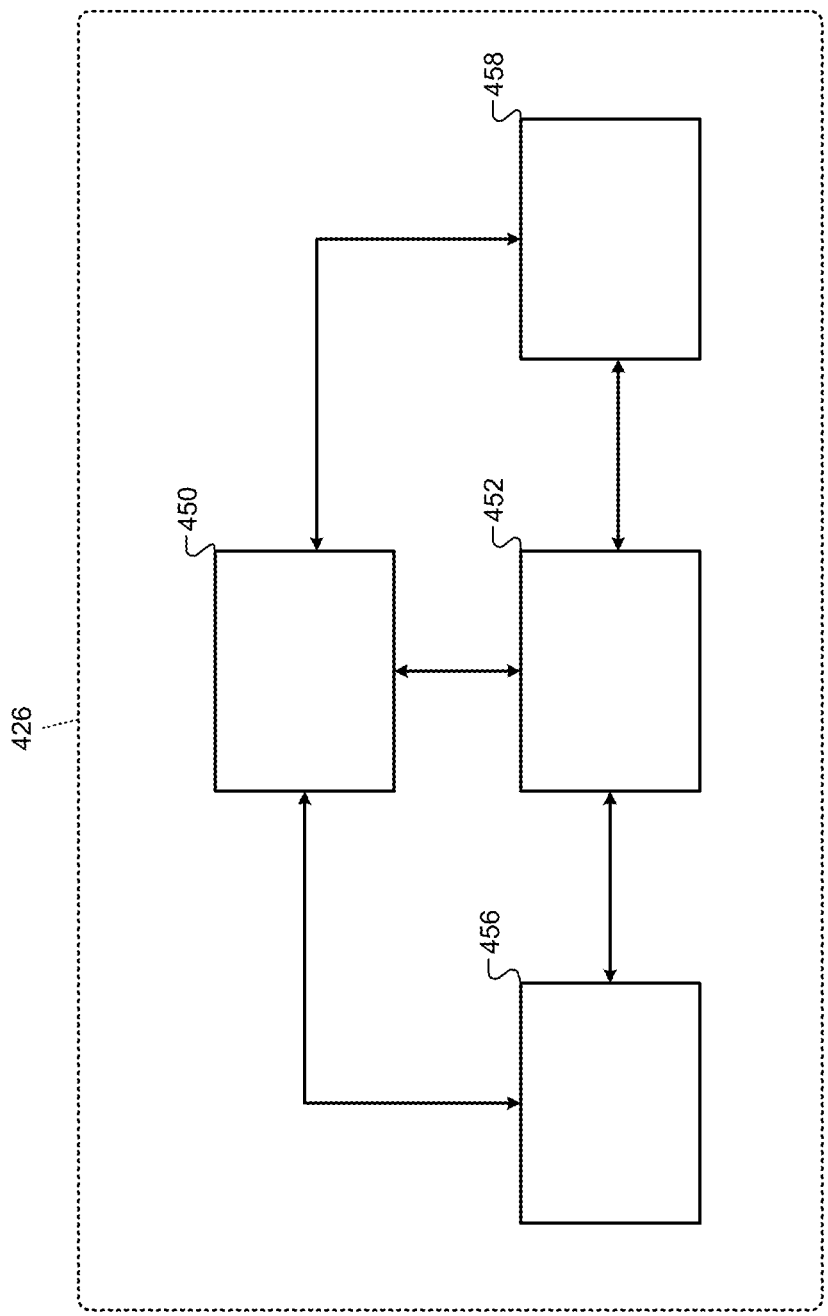
FIG. 8 is a functional block diagram of the control module of FIG. 7.

Referring now to FIG. 8, the vehicle control module 426 includes a remote start module 450, a thermal device control module 452, a climate control module 456, and a compensation factor module 458. The remote start module 450 initiates heating or cooling of the seat cushion when remote start is active. The remote start module 450 may activate remote start in response to a wireless signal generated by a key fob (not shown) when a user presses a button on the key fob associated with remote start.

The remote start module 450 only applies heating or cooling when the vehicle seats are unoccupied. Thus, when remote start is active, the remote start module 450 determines whether the seats are occupied by detecting a pressure at each sensor 414. If the sensors 414 indicate that the seat is occupied, the remote start module 450 does not apply heating or cooling to the seat. In contrast, if the sensors 414 indicate that the seat is unoccupied, the remote start module 450 determines whether the seat should be heated or cooled.

The remote start module 450 determines whether the seat should be heated or cooled based on a difference between a temperature measured by the temperature sensor 418 and a setpoint temperature. The setpoint temperature may be stored in the remote start module 450, or it may be set by an occupant via the user interface device 424. The remote control module 450 applies maximum power to the TEDs 412 and a predetermined power to the blower 422. The predetermined power may be stored in the remote start module 450.

The remote start module 450 continues to supply power to the TEDs 412 and the blower 422 until a remote start off condition is met to indicate that remote start is no longer active. A remote start off condition may be satisfied upon opening of a vehicle door, sensing of pressure at any of the sensors, insertion of a key into the ignition, or pressing of a keyless ignition button.

The thermal device control module 452 is active when the vehicle is on. The thermal device control module 452 controls the magnitude of power supplied to the TEDs 412 based on inputs from the sensors 414, a command signal from the user interface device 424, and/or a detected seat temperature from temperature sensor 418. The thermal device control module 452 determines whether seat climate control is on based on input from the user interface device 424. If climate control is on, the thermal device control module 452 determines whether the seat is occupied and what zones of the seat are occupied by detecting a pressure at each sensor 414 and comparing the detected pressures with one or more threshold pressures, which may be predetermined.

When a seat is occupied, the climate control module 456 determines whether the seat should be heated or cooled. The climate control module may compare a detected temperature from the temperature sensor 418 with an occupant setpoint temperature or temperature level from the user interface device 424. Alternatively, the climate control module may determine whether the seat should be heated or cooled based only on an input from the user interface device 424. The climate control module 456 sets the polarity of the TEDs 412 based on the above determination. The thermal device control module 452 may adjust the amount of power supplied to the blower 422 based on whether the system is heating or cooling.

The thermal device control module 452 estimates pressure at each TED 412 based on pressures of adjacent sensors 414. The estimated pressure is referred to as a compensation factor. The thermal device control module 452 determines a power requirement at each TED 412 based on the estimated pressures or compensation factors. The Thermal device control module 452 determines the duty cycle based on inputs from the user interface device 424 and the temperature sensor 418 and applies power to each TED 412 based on the power requirement and the duty cycle. The thermal device control module 452 continues to apply power as described above until climate control is turned off. When climate control is turned off, the TEDs and the blower are shut off.

With reference to FIGS. 9A-9F, an example method for controlling the TEDs 412 and the blower 422 to heat or cool a vehicle seat begins at 502. The method is described in the context of the modules included in the example implementation of the vehicle control module 426 shown in FIG. 8. However, the particular modules that perform the steps of the method may be different than those mentioned below and/or the method may be implemented apart from the modules of FIG. 8. In addition, while the method describes use of a plurality of pressure sensors disposed within the seat, it should be understood that other sensors, such as force sensors or strain gauges, may be used in the same or similar manner.

At 504, the remote start module 450 determines whether remote start is active. Activation of remote start can be detected, for example, when a remote start button on a key fob has been pressed. If remote start is not active, the method continues at 532 where control of the TEDs 412 and the blower 422 is transferred to the thermal device control module 452. If remote start is active, the method continues at 506 where the remote start module 450 receives the pressure $P_{(xi,yi)}$ from each pressure sensor 414.

At 508, the remote start module 450 determines whether any of the measured pressures $P_{(xi,yi)}$ exceed a predetermined pressure $P_{th(xi,yi)}$, which may be a threshold pressure. Each sensor may have its own predetermined pressure. A predetermined pressure may be a base calibration value of the sensor that is measured after a vehicle is assembled without any external loads being applied to the seat. A predetermined pressure may be greater than zero due to forces applied by the seat components, for example. Together, the predetermined pressures make up a "null set," that can be used to determine whether the seat or an area on the seat is occupied. Returning to 508, if the remote start module 450 determines that a pressure $P_{(xi,yi)}$ at a sensor $S_{(xi,yi)}$ exceeds a predetermined pressure $P_{th(xi,yi)}$, then that sensor is identified as "non-null" at 510. Conversely, if the remote start module 450 determines that a pressure at a sensor does not exceed a predetermined pressure, then that sensor is identified as "null" at 512.

Figure 9A:
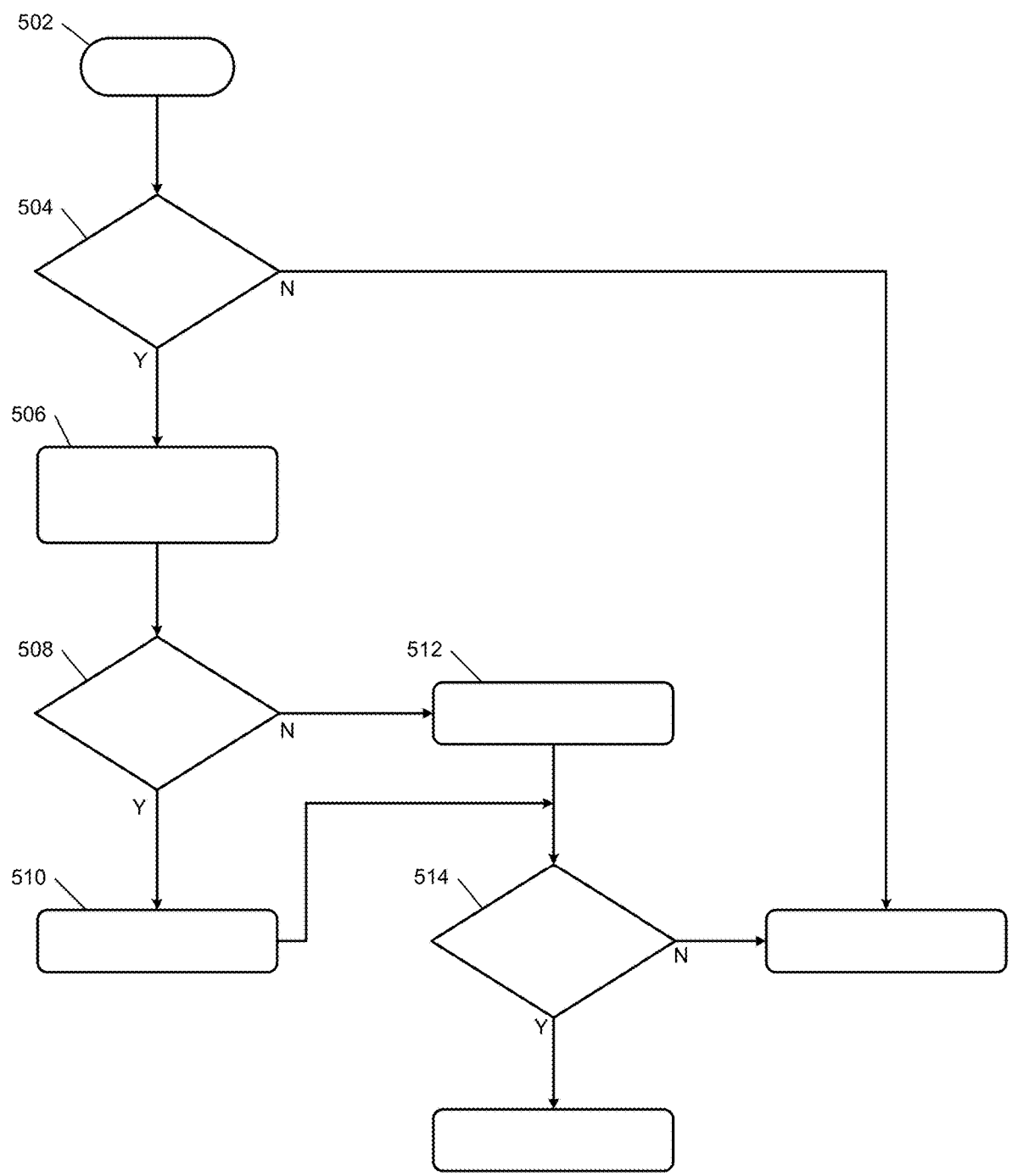
FIGS. 9A-9F are flowcharts illustrating an example control method according to the principles of the present disclosure.
Figure 9B:
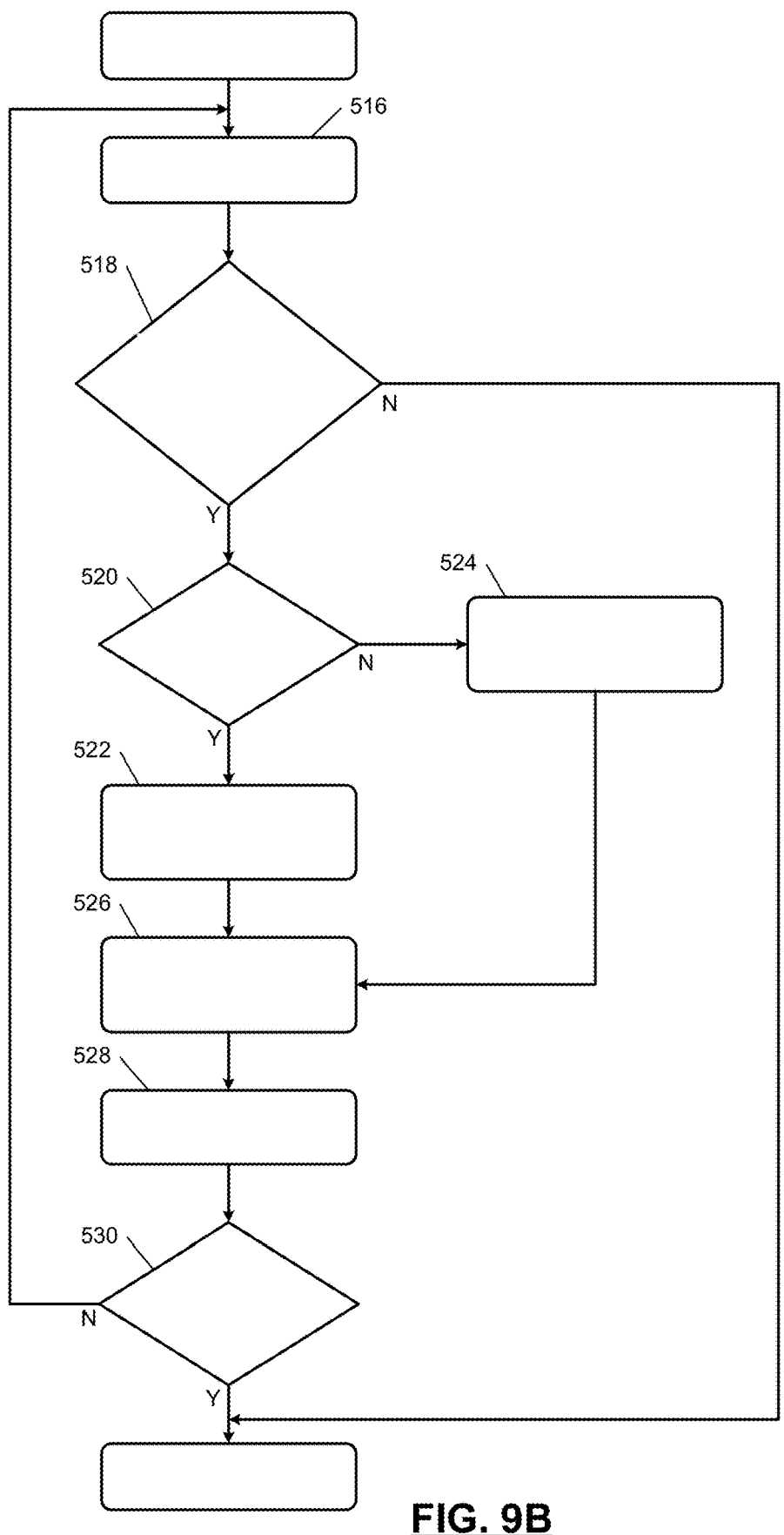
Figure 9C:
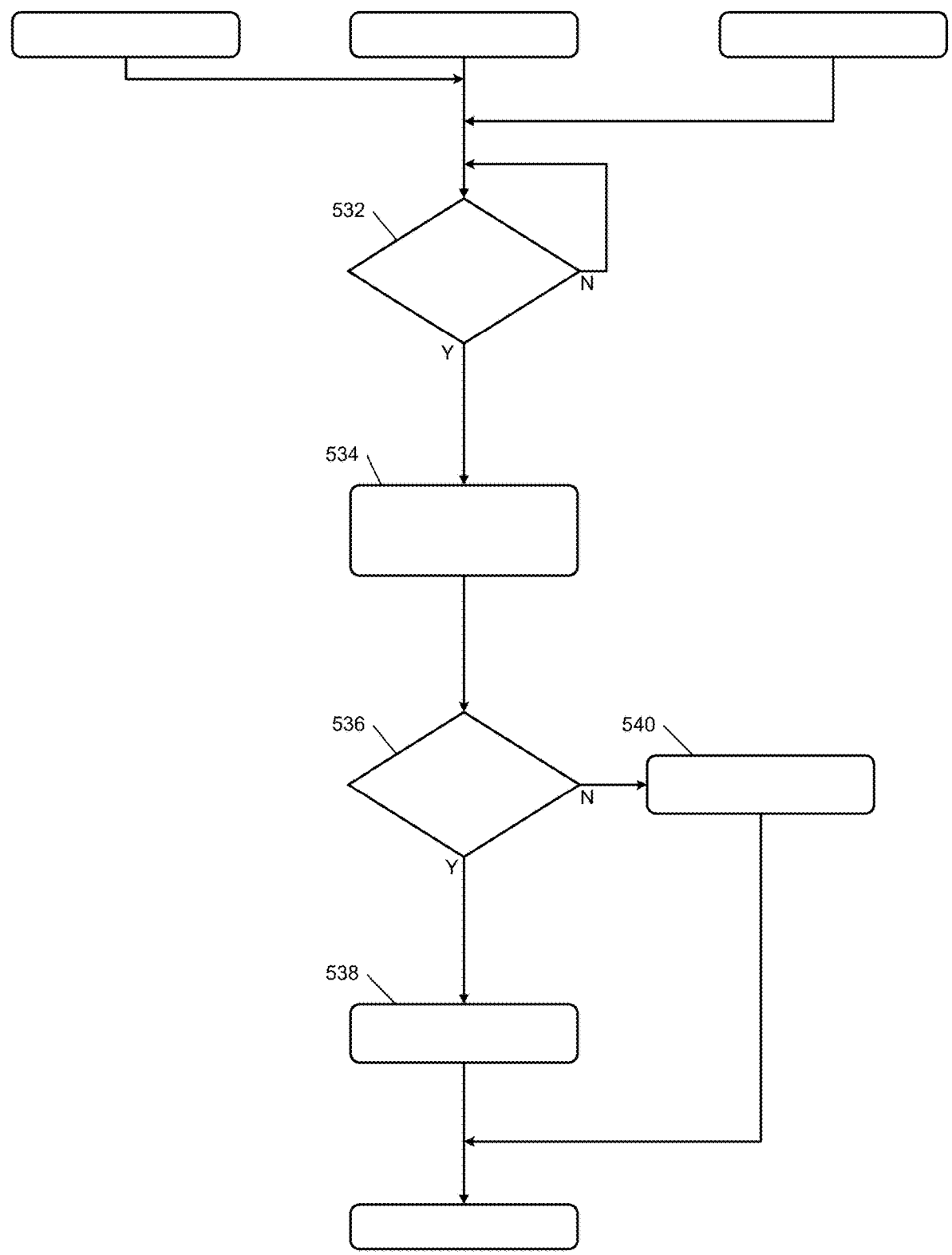
Figure 9D:
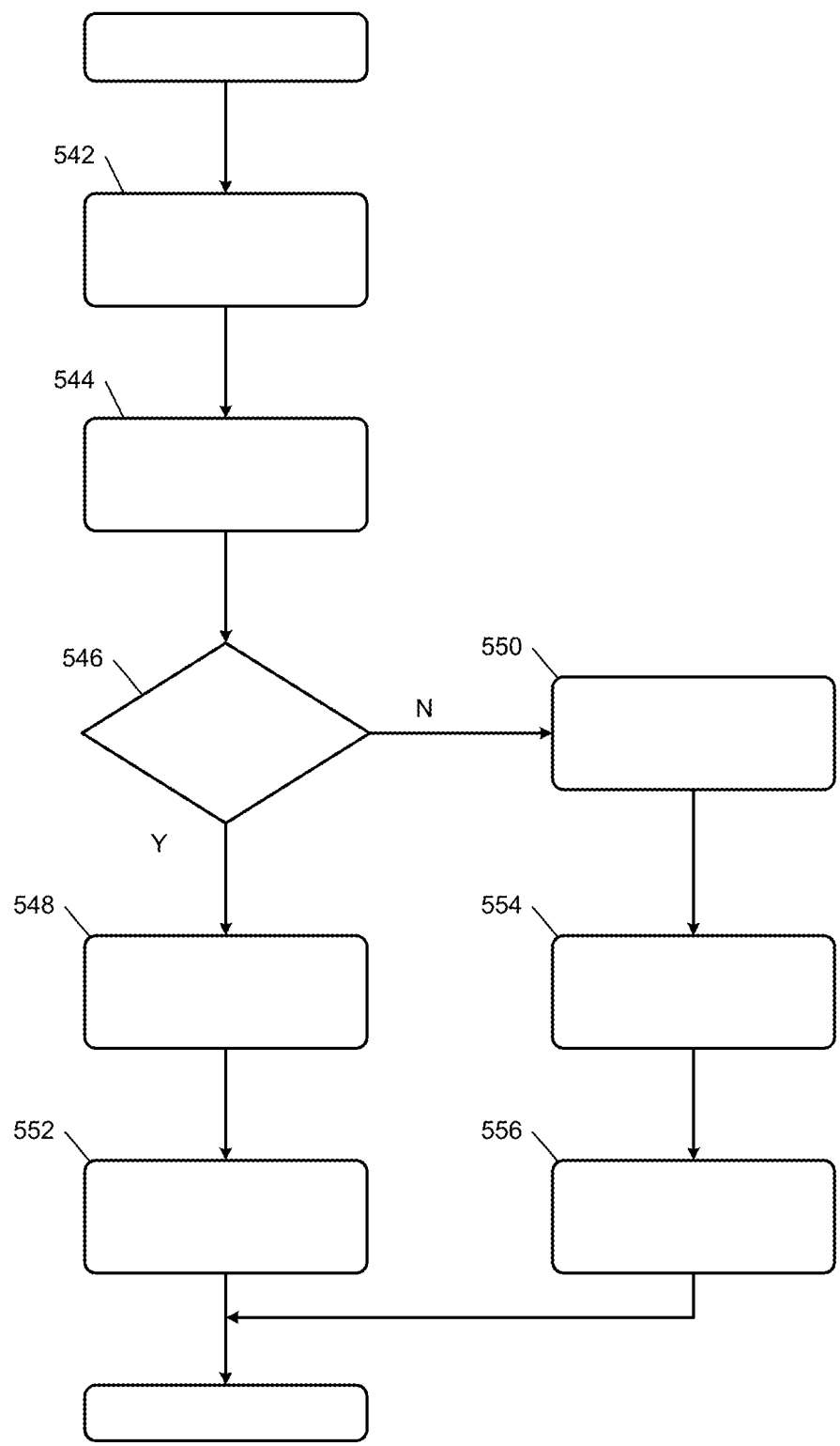

At 514, the remote start module 450 determines whether all sensors are identified as "null." A negative outcome at 514 indicates that a person or object is occupying the vehicle seat. If there is a person or object in the vehicle seat, then the remote control module 450 will not heat or cool the seat and control is transferred to the thermal device control module 452, which continues at 532 (FIG. 9C). However, a positive outcome at 514 indicates that the vehicle seat is unoccupied, and therefore the remote start module 450 maintains control and continues to 516 (FIG. 9B).

At 516, the remote start module 450 receives a seat temperature $T_S$ from the temperature sensor 418. Next, at 518, the remote start module 450 determines whether the difference between the seat temperature $T_S$ and a remote start setpoint temperature $T_{RS}$ exceeds a predetermined remote start value $V_{RS}$. The remote start setpoint temperature $T_{RS}$ may be based on user input or it may have been pre-programmed by the manufacturer, for example (e.g., it may be a predetermined value). If the difference between the seat temperature $T_S$ and the predetermined remote start temperature $T_{RS}$ does not exceed a predetermined remote start value $V_{RS}$, then control moves to the thermal device control module at 532. In contrast, if the difference between the seat temperature $T_S$ and the predetermined remote start temperature $T_{RS}$ does exceed a predetermined remote start value $V_{RS}$, then the remote start module continues to 520.

At 520, the remote start module 450 determines whether the remote start setpoint temperature $T_{RS}$ is greater than the seat temperature $T_S$. If the remote start setpoint temperature $T_{RS}$ is greater than the seat temperature $T_S$, the remote start module 450 generates a heating command signal and sets the polarity of all of the TEDs 412 to positive one (+1) at 522. If the remote start setpoint temperature $T_{RS}$ is les s than or equal to the seat temperature $T_S$, the remote start module 450 generates a cooling command signal and sets the polarity of all of the TEDs 412 to negative one (−1) at 524. Next, at 526, maximum power $PR_{max}$ is supplied to all of the TEDs 412. At 528, a predetermined power $B_{RS}$ is supplied to the blower 422.

At 530, the remote start module 450 determines whether a remote start off trigger condition is met. By way of example only, a remote start off trigger condition may include opening of a vehicle door, sensing of pressure at any of the sensors, insertion of a key into the ignition, or pressing of a keyless ignition button. If a remote start off trigger condition is not met, then control returns to 516. If a remote start off trigger condition is met, control is transferred to the thermal device control module 452, which continues at 532 (FIG. 9C).

At 532, the thermal device control module 452 determines whether climate control is on based on a command signal from the user interface device 424. When climate control is on, the method continues at 534. Otherwise, the method continues at 532. At 534, the thermal device control module 452 receives a pressure $P_{(xi,yi)}$ at each sensor 414. Next, at 536, the thermal device control module 452 determines whether any pressure $P_{(xi,yi)}$ exceeds the predetermined pressure $P_{th(xi,yi)}$ for the corresponding sensor 414. If the pressure measured by a sensor 414 exceeds the predetermined pressure, that sensor 414 is identified as "non-null" at 538. If the pressure measured by a sensor 414 does not exceed the predetermined pressure, that sensor 414 is identified as "null" at 540. The method continues at 542 (FIG. 9D) after identifying all of the sensors 414 as "non-null" or "null."

At 542, the climate control module 456 receives an occupant setpoint temperature $T_O$ from the user interface device 424. The occupant setpoint temperature $T_O$ may be set directly by the occupant. Alternatively, the occupant may simply select a high, medium, or low heating or cooling level, and the climate control module 456 may select the occupant setpoint temperature $T_O$ based on the heating or cooling level selected. In one example, the climate control module 456 selects the occupant setpoint temperature $T_O$ based on a predetermined relationship between the heating or cooling level and the occupant setpoint temperature $T_O$.

At 544, the climate control module 456 detects the seat temperature $T_M$. The climate control module 456 determines whether the occupant setpoint temperature $T_O$ exceeds the seat temperature $T_M$ at 546. If the occupant setpoint temperature $T_O$ exceeds the measured temperature $T_M$, the method continues at 548. Otherwise, the method continues at 550.

At 548, the climate control module 456 generates a heating command signal and, in response, the thermal device control module 452 sets the polarity of each TED 412 to positive one (+1). At 552, the thermal device control module 452 sets the blower to a predetermined blower heating power $B_H$.

Figure 9E:
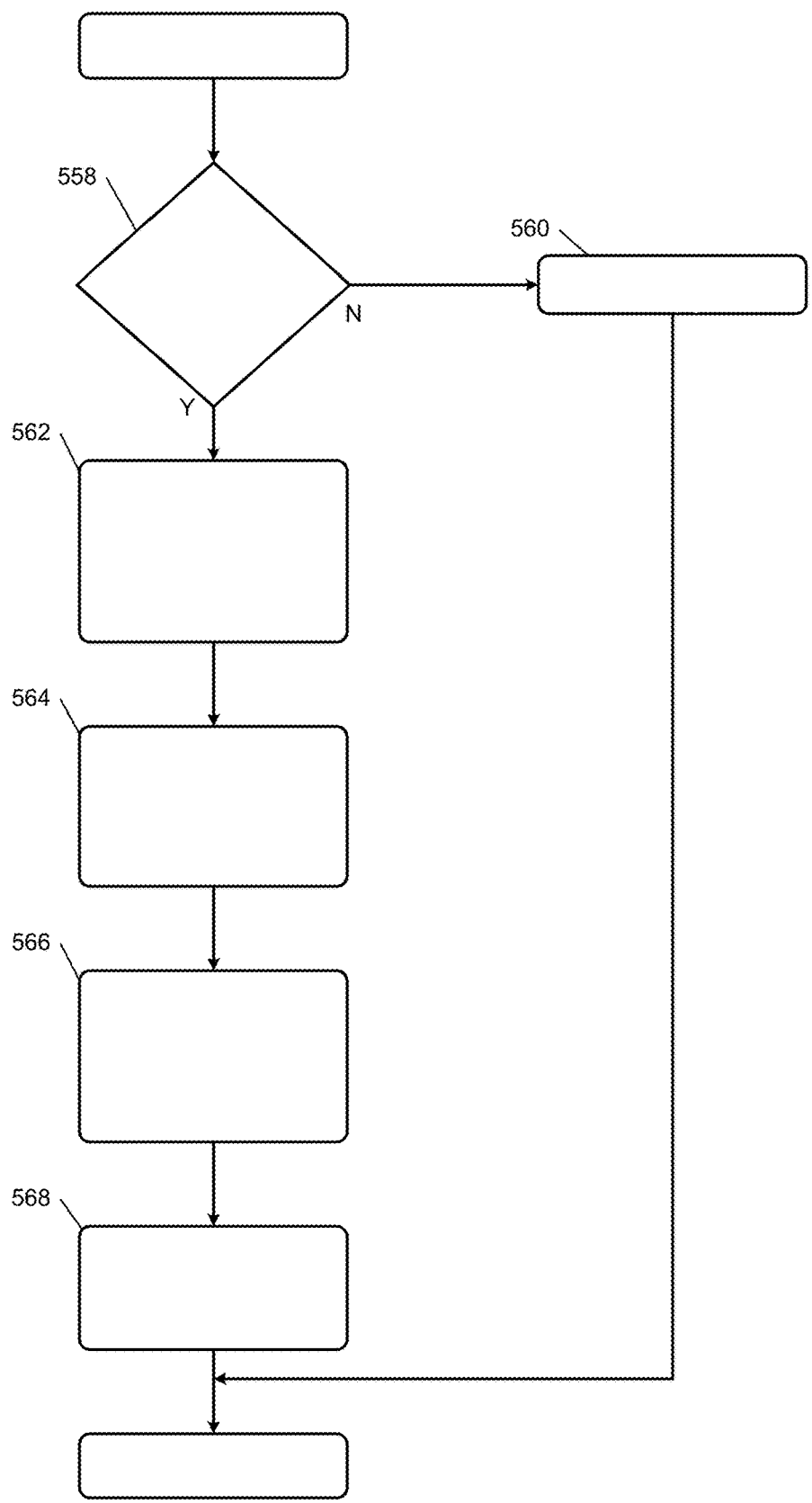

At 550, the climate control module 456 generates a cooling command signal and, in response, the thermal device control module 452 sets the polarity of each TED 412 to negative one (−1). At 554, the thermal device control module 452 determines the average pressure $P_{avg}$ of all the pressure sensors $P_{(xi,yi)}$. At 556, the thermal device control module 452 determines a blower cooling power $B_C$ based on the average pressure $P_{avg}$ using, for example, a predetermined relationship between the average pressure $P_{avg}$ and the blower cooling power $B_C$. In one example, the thermal device control module 452 increases the blower cooling power $B_C$ as the average pressure $P_{avg}$ increases and vice versa. After completing 552 or 556, the method continues at 558 (FIG. 9E).

At 558, for each TED 412, the compensation factor module 458 determines whether the TED 412 is between any "non-null" sensors. If a TED 412 is not between any "non-null" sensors, the method continues at 560 where the compensation factor module 458 sets the compensation factor $f_{(xi,yi)}$ for that TED 412 to a maximum compensation factor $f_{max}$. By setting the compensation factor $f_{(xi,yi)}$ for a TED 412 to the maximum compensation factor $f_{max}$, the compensation factor module 458 causes the thermal device control module 452 to set the magnitude of power supplied to that TED 412 to zero, as indicated by equation (3) discussed below. Thus, by setting the compensation factor $f_{(xi,yi)}$ for a TED 412 to the maximum compensation factor $f_{max}$, the compensation factor module 458 indicates that the respective seat area is unoccupied and heating or cooling should not be applied. If a TED 412 is between any "non-null" sensors, the method continues at 562 where the compensation factor module 458 determines a compensation factor $f_{(xi,yi)}$ at each TED 412 based on the pressures measured by adjacent sensors 414. Each TED 412 will have a respective compensation factor so that all compensation factors together form a set of compensation factors.

The compensation factor $f_{(xi,yi)}$ for a TED 412 is calculated using interpolation of the pressures $P_{(xi,yi)}$ of adjacent sensors. For example, when the climate control system is arranged as shown in FIG. 4, the compensation factor $f_{(xi,yi)}$ for a TED 214 is calculated using an equation such as $$f_{(1,3)} = P_{(1,3)} - d_{(1,3-1,3)}\left(\frac{P_{(1,3)} - P_{(2,3)}}{d_{(1,3-1,3)} + d_{(1,3-2,3)}}\right) \quad (1)$$

where $f_{(1,3)}$ is the compensation factor of a TED 214 labelled TED 214(1,3) in FIG. 4, $P_{(1,3)}$ is the pressure measured by the pressure sensor 218 labelled 218(1,3) in FIG. 4, $P_{(2,3)}$ is the pressure measured by the pressure sensor 218 labelled 218(2,3) in FIG. 4, $d_{(1,3-1,3)}$ is the first distance 262 in FIG. 4, and $d_{(1,3-2,3)}$ is the second distance 266 in FIG. 4. The TED 214(1, 3) is the TED 214 in the first or top row 226 and the third or right column 230. The pressure sensor 218(1,3) is the pressure sensor 218 in the first or top row 238 and the third or right column 242. The pressure sensor 218(1,3) is the pressure sensor 218 in the first or top row 238 and the third or right column 242.

In another example, when the climate control system is arranged as shown in FIG. 5, the compensation factor of the TED 281 is calculated using an equation such as $$f_{(1,1)} = \frac{1}{2}\left[P_{(1,1)} - d_{(1,1-1,1)}\left(\frac{P_{(1,1)} - P_{(2,2)}}{d_{(1,1-1,1)} + d_{(1,1-2,2)}}\right) + P_{(1,2)} - d_{(1,1-1,2)}\left(\frac{P_{(1,2)} - P_{(1,2)}}{d_{(1,1-1,2)} + d_{(1,1-2,1)}}\right)\right] \quad (2)$$

where $f_{(1,1)}$ is the compensation factor of the TED 281, $P_{(1,1)}$ is the pressure measured by the first pressure sensor 284, $P_{(1,2)}$ is the pressure measured by the second pressure sensor 285, $P_{(2,1)}$ is the pressure measured by the third pressure sensor 286, $P_{(2,2)}$ is the pressure measured by the fourth pressure sensor 287, $d_{(1,1-1,1)}$ is the first distance 290, $d_{(1,1-1,2)}$ is the second distance 291, $d_{(1,1-2,1)}$ is the third distance 292, and $d_{(1,1-2,2)}$ is the fourth distance 293. The above compensation factor formulas are merely exemplary. When the TEDs and sensors are arranged other than as shown in FIGS. 4 and 5, compensation factors may be calculated using interpolation of adjacent sensors using similar methods.

Referring again to FIG. 9E, at 564, the thermal device control module 452 determines a minimum compensation factor $f_{min}$, which is a minimum value of all nonzero compensation factors. At 566, the thermal device control module 452 determines a maximum compensation factor $f_{max}$, which is a maximum value of the entire set of compensation factors. At 568, the thermal device control module 452 determines a range of compensation factors $R_f$ by subtracting the minimum compensation factor $f_{min}$ from the maximum compensation factor $f_{max}$.

Figure 9F:
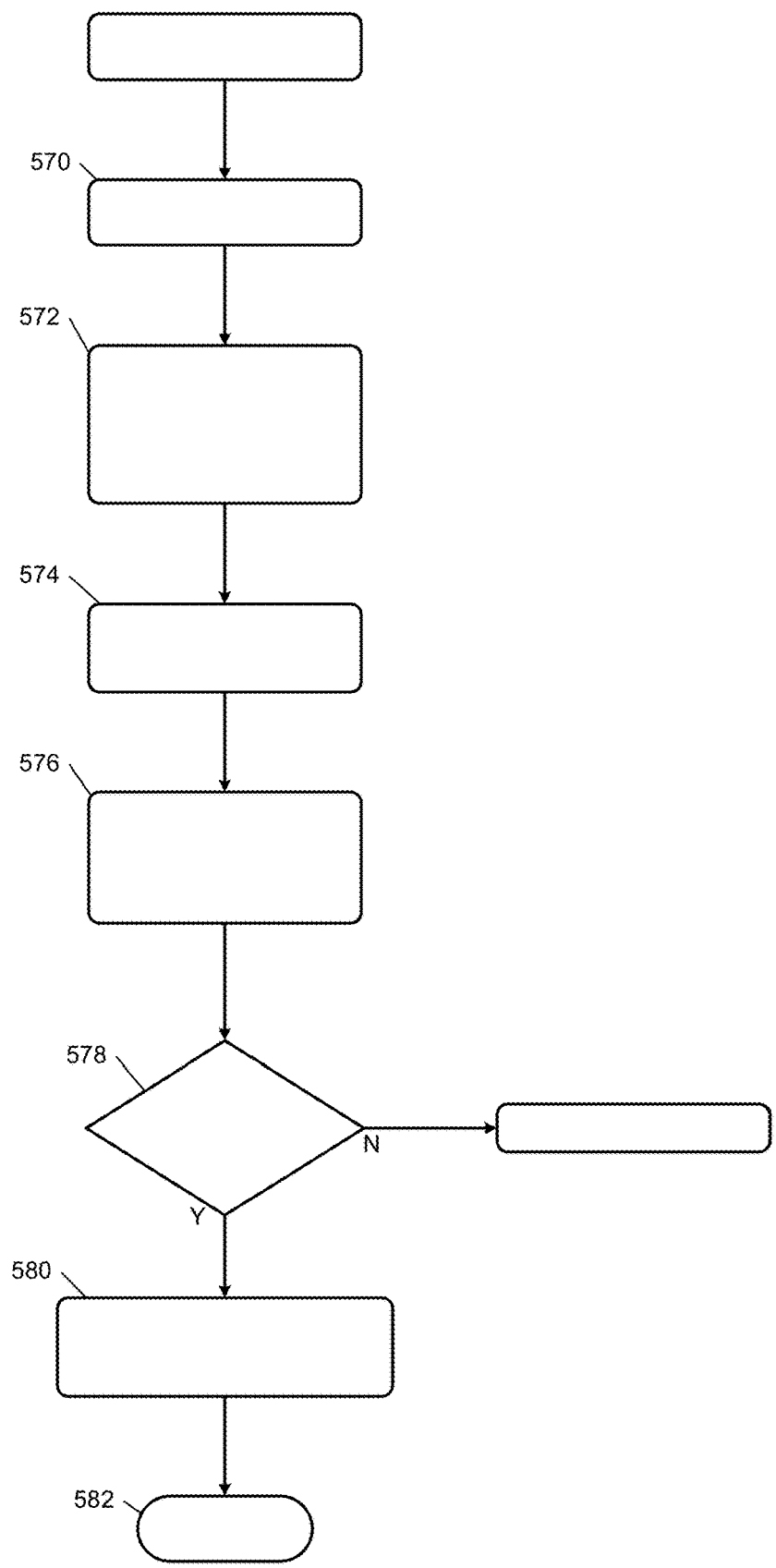

After completing 568, the method continues at 570 (FIG. 9F). At 570, the thermal device control module 452 determines an error E. The error may be based on vehicle conditions, or it may be a predetermined value or a calibration factor. Sources of error include the specific heat of the seat cushion material, load deflection of the seat material, sensor variation, and dimensional variation, by way of non-limiting example.

At 572, the thermal device control module 452 determines a power requirement $PR_{(xi,yi)}$ for each TED based on the individual compensation factor for that TED, the range $R_f$, and the error E. The power requirement of a TED is the power required by that TED. The thermal device control module 452 controls the power supply 420 to adjust the magnitude of power supplied to each TED 412 to the power requirement for that TED 412. The power requirement is decreased as seat cushion material is compressed and the heat transfer distance is reduced. Thus, the power requirement is inversely related to the pressure on the seat cushion, which is expressed as compensation factor $f_{(xi,yi)}$ for a TED $T_{(xi,yi)}$ located in row xi and column yi. In one example, the power requirement $PR_{(xi,yi)}$ for the TED $T_{(xi,yi)}$ is calculated using the following equation $$PR_{(xi,yi)} = 100\left(\frac{f_{max} - f_{(xi,yi)}}{R_f}\right) + \text{error} = 100\left(\frac{f_{max} - f_{(xi,yi)}}{f_{max} - f_{min}}\right) \quad (3)$$

Next, at 574, the thermal device control module 452 determines the duty cycle D based on the occupant setpoint temperature $T_O$ and the seat temperature $T_S$. In one example, when the occupant selects the low, medium, or high heating or cooling levels using the user interface device 424, the thermal device control module 452 sets the duty cycle D to 50%, 75%, or 90%, respectively. Alternatively, when the user interface device 424 allows the occupant to select a specific seat temperature, the thermal device control module 452 sets the duty cycle D to a value that is directly proportional to the setpoint temperature $T_O$. At 576, the thermal device control module 452 supplies power to each TED according to the individual power requirements and the duty cycle D.

At 578, the thermal device control module 452 determines whether climate control switch is off based on a control signal from the user interface device 424. If climate control is off, then control moves to 580 where power to the blower 422 is turned off and power to the TEDs is turned off. However, if the climate control switch is not off at 578, control returns to 532 (FIG. 9C). The thermal device control module 452 continues to adjust the power supplied to the TEDs until climate control is switched off.

Figure 10:
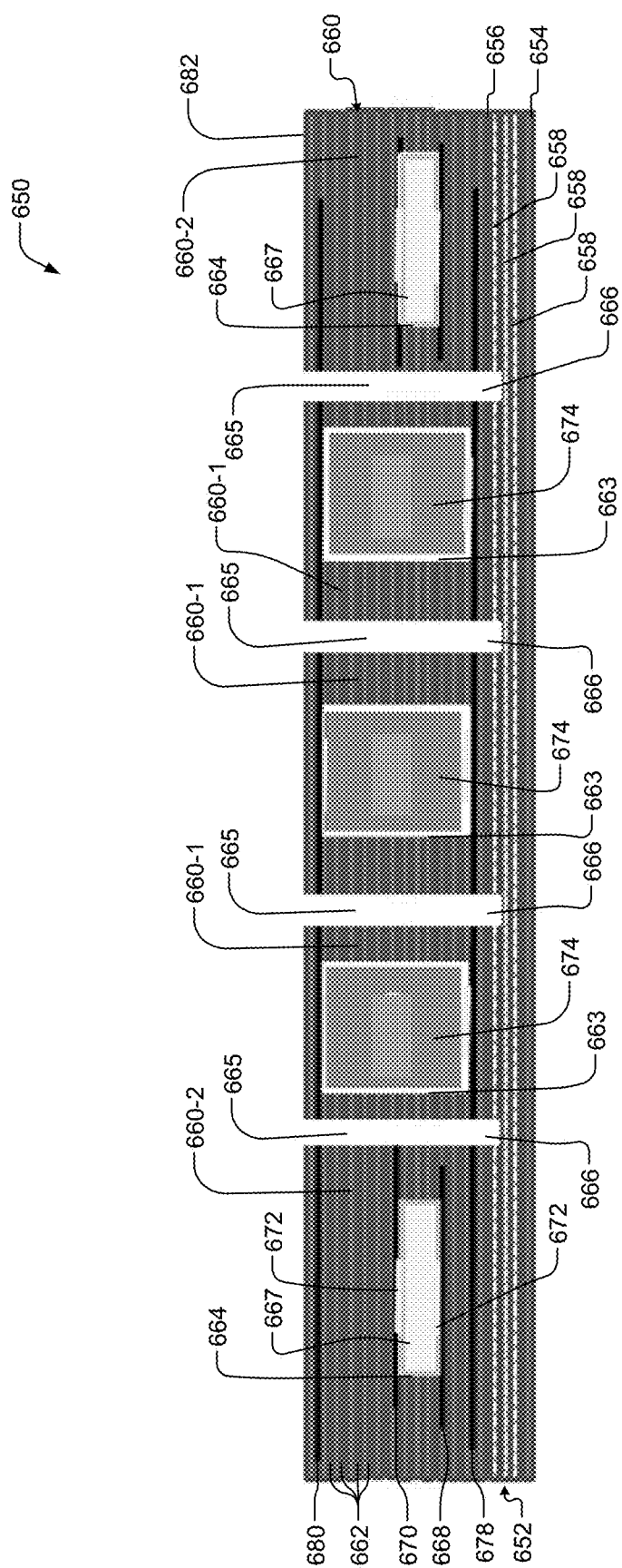
FIG. 10 shows an example seat climate control system constructed according to the method of FIGS. 11A and 11B.
Figure 11A:
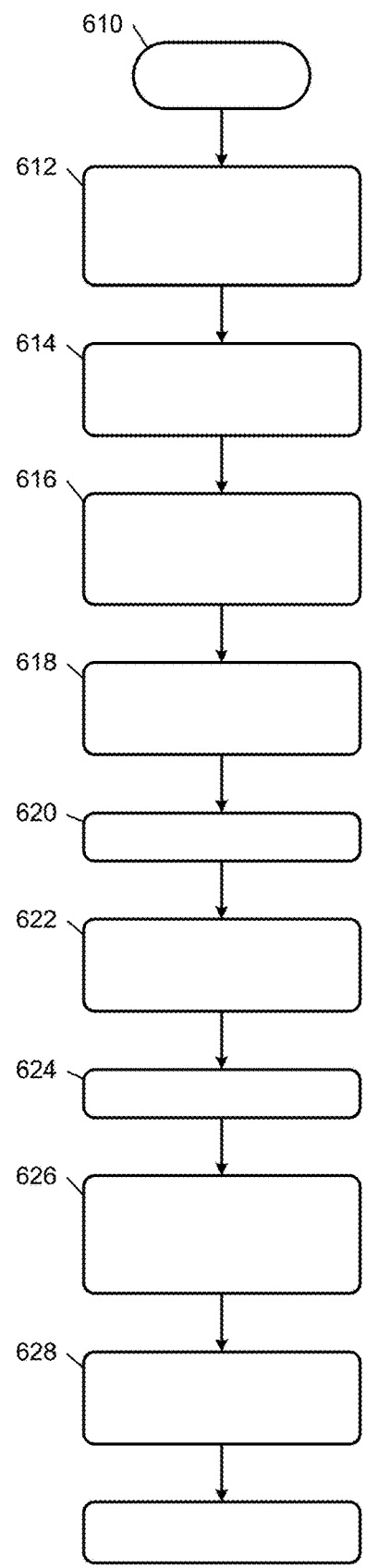
FIGS. 11A and 11B are flowcharts illustrating an example method of manufacturing a seat climate control system according to the principles of the present disclosure.
Figure 11B:
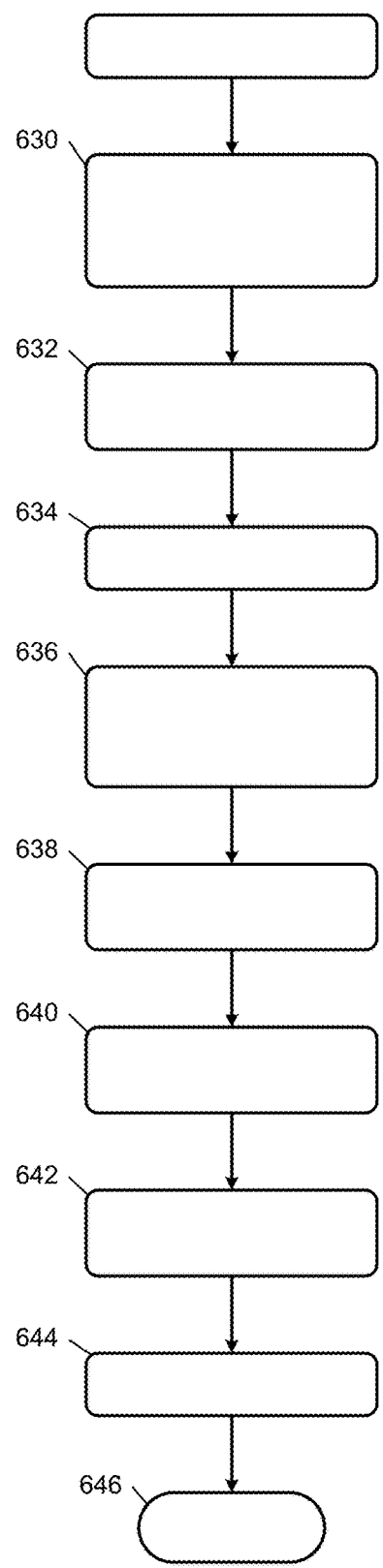

Referring now to FIG. 10, an example seat climate control system 650 manufactured in accordance with the method of FIGS. 11A and 11B is shown. The seat climate control system 650 includes an airflow chamber 652, an insulating body 660 disposed on the airflow chamber 652, pressure sensors 667 disposed in the body 660, and TEDs 674 disposed in the body 660. The airflow chamber 652 and the insulating body 660 may be made of an insulating material such as polyurethane.

The airflow chamber 652 includes a lower cover 654, an upper cover 656, and a plurality of horizontal airflow channels 658 disposed between the lower and upper covers 654, 656. The insulating body 660 is disposed on the upper cover 656 of the airflow chamber 652. The body 660 is made of a plurality of insulation layers 662 and includes first portions 660-1 that define a plurality of TED insulating pockets 663 and second portions 660-2 that define a plurality of sensor insulating pockets 664. The portions 660-1, 660-2 of the body 660 are separated by a plurality of vertical airflow channels 665 that are in fluid communication with the horizontal airflow channels 658 via openings 665 in the upper cover 656.

Each pressure sensor 667 is disposed in one of the sensor insulating pockets 664. Each pressure sensor 667 is disposed between a bottom sensor circuit 668 and a top sensor circuit 670. Each pressure sensor 667 is electrically connected to the bottom and top sensor circuits 668, 670 by conductive adhesive 672.

Each TED 674 is disposed in one of the TED insulating pockets 663. Each TED 674 is disposed between a bottom TED circuit 678 and a top TED circuit 680. Each TED 674 is electrically connected to the bottom and top TED circuits 678, 680 by conductive adhesive 672. The circuits comprise conductive ink, such as graphene or silver. The vertical airflow channels 665 extend through a top surface 682 of the seat climate control system 650, through the insulation layers 662, and through the openings 666 in the upper cover 656 to the horizontal airflow channels 658 in the airflow chamber 652.

The sensor insulating pockets 664 completely enclose the pressure sensors 667 except for the surfaces of the pressure sensors 667 that are electrically connected to the bottom and top sensor circuits 668, 670. Similarly, the TED insulating pockets 663 completely enclose the TEDs 674 except for the surfaces of the TEDs 674 that are electrically connected to the bottom and top TED circuits 678, 680. In addition, the insulation layers 662 that form the insulating pockets 663 are disposed above and below each of the bottom and top sensor circuits 668, 670 and above and below each of the bottom and top sensor circuits 668, 670.

Referring to FIGS. 11A and 11B, a method of assembling the example seat climate control system 650 of FIG. 10 is provided. The method starts at 610. At 612, the lower cover 654 for the airflow chamber 652 is printed using, for example, a 3D printer. The airflow chamber 652 is printed at 614. The upper cover 656 is printed at 616, leaving void spaces to form the openings 666 that place the horizontal airflow channels 658 in fluid communication with the vertical airflow channels 665.

At 618, the bottom TED circuit 678 is printed. The insulation layers 662 are printed at 620 to form the portions 660-1, 660-2 of the insulating body 660 that define the insulating pockets 663, 664. The insulation layers 662 are printed with open spaces to form the TED insulating pockets 663 and the vertical airflow channels 665. The bottom sensor circuit 668 is printed at 622.

At 624, printing of the insulating layers 662 continues to form the portions 660-1, 660-2 of the insulating body 660 that define the insulating pockets 663, 664. The insulating layers 662 are printed with open spaces that form the insulating pockets 663, 664 and the vertical airflow channels 665. At 626, conductive adhesive 672 is placed into the sensor pockets 664. The sensors 667 are placed into the sensor pockets 664 at 628. Conductive adhesive 672 is placed on top of the sensors at 630. The top sensor circuit 670 is printed at 632.

At 634, printing of the insulating layers 662 continues while leaving holes to form the vertical airflow channels 665 and TED insulating pockets 663. At 636, adhesive 672 is placed into the TED pockets 676. The TEDs 674 are placed into the TED pockets 676 at 638. At 640, conductive adhesive 672 is placed on top of the TEDs 674. The top TED circuit 680 is printed at 642. At 644, printing of the insulating layers 662 continues to finish forming the portions 660-1, 660-2 of the insulating body 660 that define the insulating pockets 663, 664. The method ends at 646.

Figure 12:
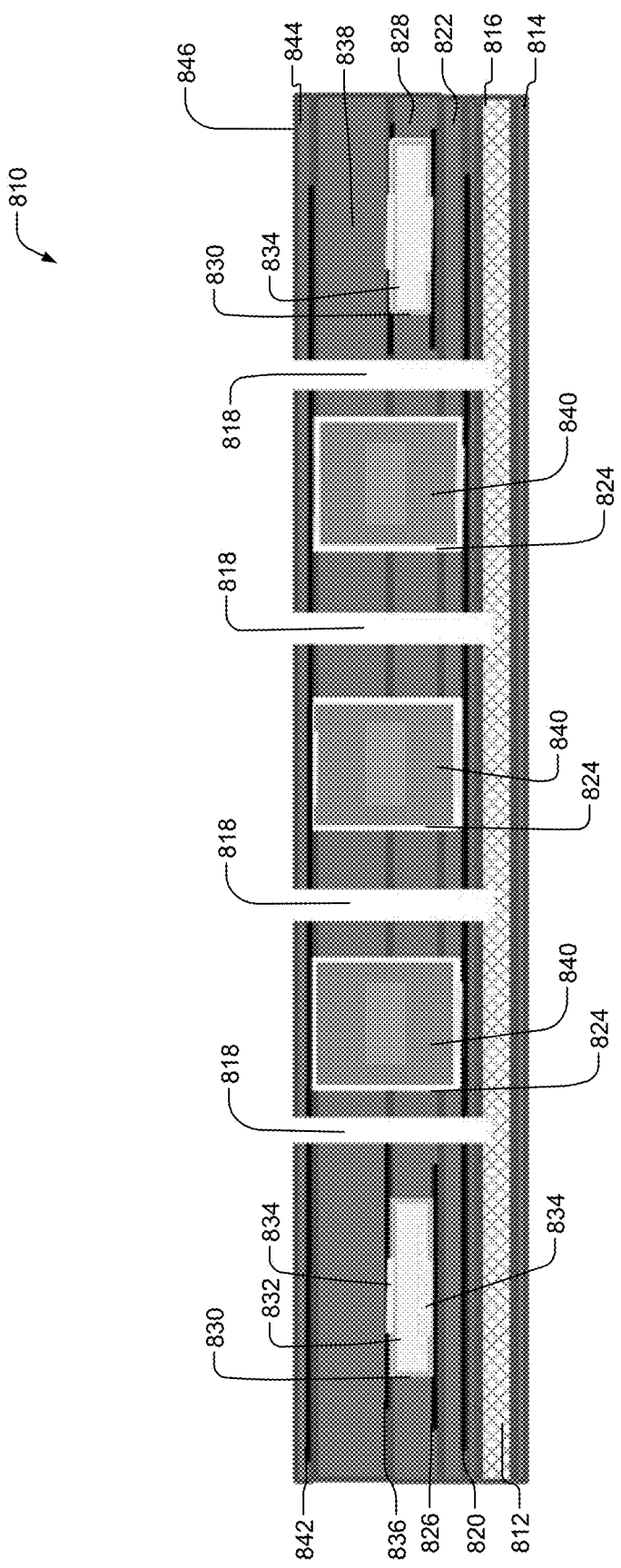
FIG. 12 shows an example seat climate control system constructed according to the method of FIGS. 13A and 13B.
Figure 13A:
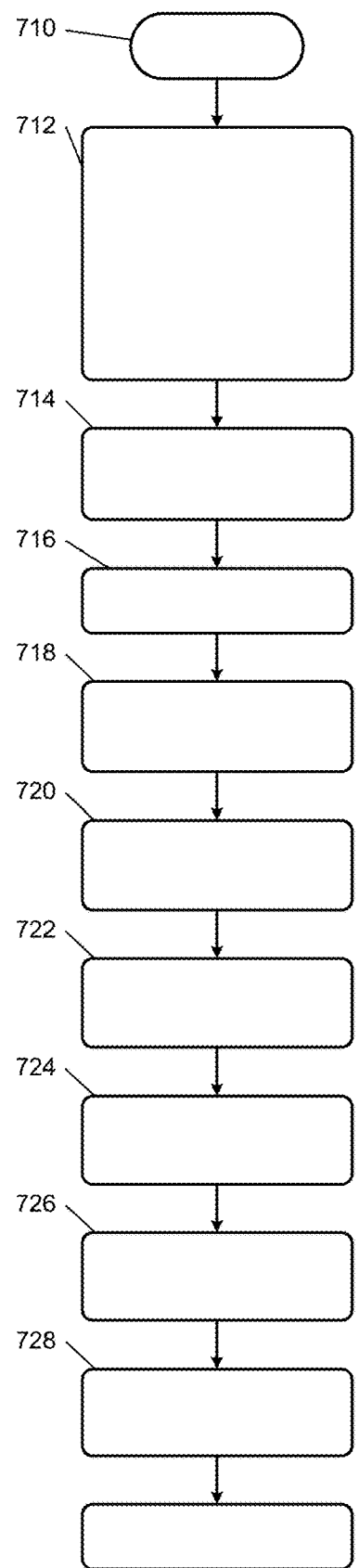
FIGS. 13A and 13B show a flowchart illustrating another example method of manufacturing a seat climate control system according to the principles of the present disclosure.
Figure 13B:
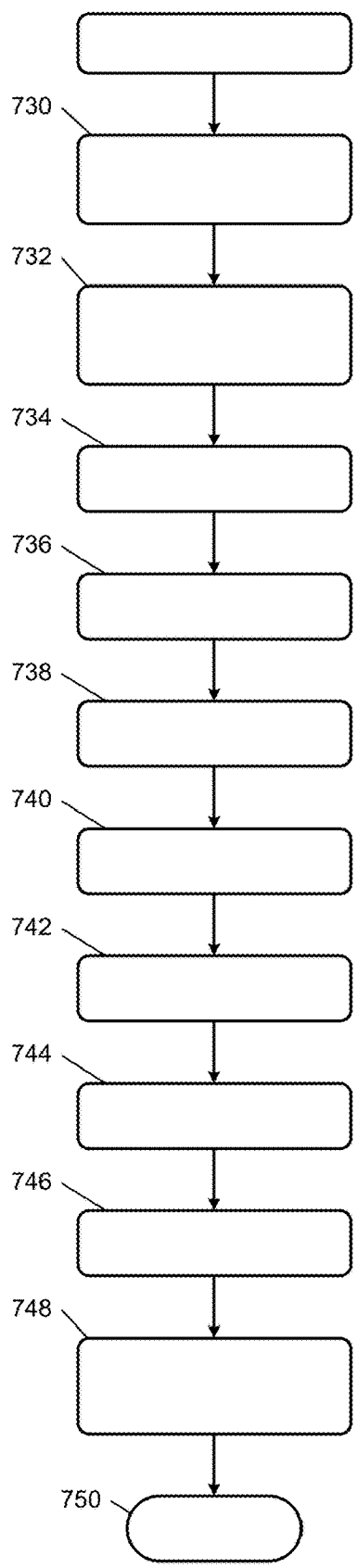

FIG. 12 shows an example seat climate control system 810 constructed in accordance with the method of FIGS. 13A and 13B. The seat climate control system 810 includes an airflow chamber 812 disposed between a first insulating layer 814 and a second insulating layer 816. The second insulating layer 816 has a plurality of openings that form a plurality of airflow channels 818 in the seat climate control system 810.

A bottom TED circuit 820 is disposed on the second insulating layer 816 and a third insulating layer 822 is disposed the bottom TED circuit 820. The third insulating layer 822 has a plurality of openings that form a plurality of airflow channels 818. The third insulating layer 822 also has a plurality of holes that form TED pockets 824. A bottom sensor circuit 826 is disposed on the third insulating layer 822.

A fourth insulating layer 828 is disposed on the bottom sensor circuit 826. The fourth insulating layer 828 has a plurality of openings that form the airflow channels 818. The fourth insulating layer 828 also has a plurality of holes that form a plurality of pressure sensor pockets 830 and a plurality of holes that form the TED pockets 824.

The seat climate control system 810 further includes a plurality of sensors 832, which may be pressure sensors. Each sensor 832 is disposed in a respective sensor pocket 830. Each sensor 832 is electrically connected to the bottom sensor circuit 826 by conductive adhesive 834. A top sensor circuit 836 is disposed on top of the sensors 832. Each sensor 832 is electrically connected to the top sensor circuit 836 by conductive adhesive 834.

A fifth insulating layer 838 is disposed on the top sensor circuit 836. The fifth insulating layer 838 has a plurality of openings that form the airflow channels 818. The fifth insulating layer 838 also has a plurality of holes that form the TED pockets 824.

The seat climate control system 810 further includes a plurality of TEDs 840. Each TED 840 is disposed in a respective TED pocket 824. Each TED 840 is electrically connected to the bottom TED circuit 820 by conductive adhesive 834. A top TED circuit 842 is disposed on the TEDs 840. The top TED circuit 842 is electrically connected to the TEDs 840 by conductive adhesive 834.

A sixth insulating layer 844 is disposed on the top TED circuit 842. The sixth insulating layer 844 has a plurality of openings that form the airflow channels 818 is disposed on the top TED circuit 842. The airflow channels 818 extend through a top surface 846 of the seat climate control system 810 and to the airflow chamber 812.

With reference to FIGS. 13A and 13B, a method of manufacturing the seat cushion 810 of FIG. 12 is provided. The method begins at 710. At 712, the airflow chamber 812, flexible circuits 820, 826, 836, 842, and insulating layers 14, 816, 822, 828, 838, 844 are fabricated. The flexible circuits include the bottom and top sensor circuits 826, 836 and the bottom and top TED circuits 820, 842.

At 714, the first insulating layer 814 is placed on a workspace at 714. At 716, the airflow chamber 812 is placed on top of the first insulating layer 814. At 718, the second insulating layer 816 is placed on top of the airflow chamber 812. The second insulating layer 816 has a plurality of openings that form the airflow channels 818. The bottom TED circuit 820 is placed on top of the second insulating layer 816 at 720.

At 722, the third insulating layer 822 is placed on the bottom TED circuit 820. The third insulating layer 822 has a plurality of openings that form the airflow channels 818 and a plurality of holes that form the TED pockets 824. At 724, the bottom sensor circuit 826 is placed on the third insulating layer 822.

At 726, the fourth insulating layer 828 is placed on the bottom sensor circuit 826. The fourth insulating layer 828 has a plurality of openings that form the airflow channels 818, a plurality of holes that form the TED pockets 824, and a plurality of holes to form the sensor pockets 830. At 728, adhesive 834 is placed in the sensor pockets 830 on top of the bottom sensor circuit 826. The sensors 832 are placed on the adhesive 834 at 730 to electrically connect the sensors 832 to the bottom sensor circuit 826. Adhesive 834 is placed on top of the sensors 832 at 732. The top sensor circuit 836 is placed at 734 so that the adhesive 834 electrically connects it to the sensors 832.

At 736, the fifth insulating layer 838 is placed on the top sensor circuit 836. The fifth insulating layer 838 has a plurality of openings that form the airflow channels 818 and a plurality of holes that form the TED pockets 824. At 738, adhesive 834 is placed in the TED pockets 824 on top of the bottom TED circuit 820. At 740, TEDs 840 are placed in the TED pockets 824 on top of the adhesive 834 to electrically connect the TEDs 840 and the bottom TED circuit 820. Next, adhesive 834 is placed on top of the TEDs 840 at 742. The top TED circuit 842 is placed at 744 so that it is electrically connected to the TEDs 840 by the adhesive 834.

At 746, the sixth insulating layer 844 is placed on the top TED circuit 842. The sixth insulating layer 844 has openings that form the airflow channels 818. Lastly, at 748, the insulating layers 814, 816, 822, 828, 838, 844 are welded together. The welding process may be thermal, ultrasonic, or radio frequency (RF), by way of non-limiting example. The method ends at 750.

Figure 14:
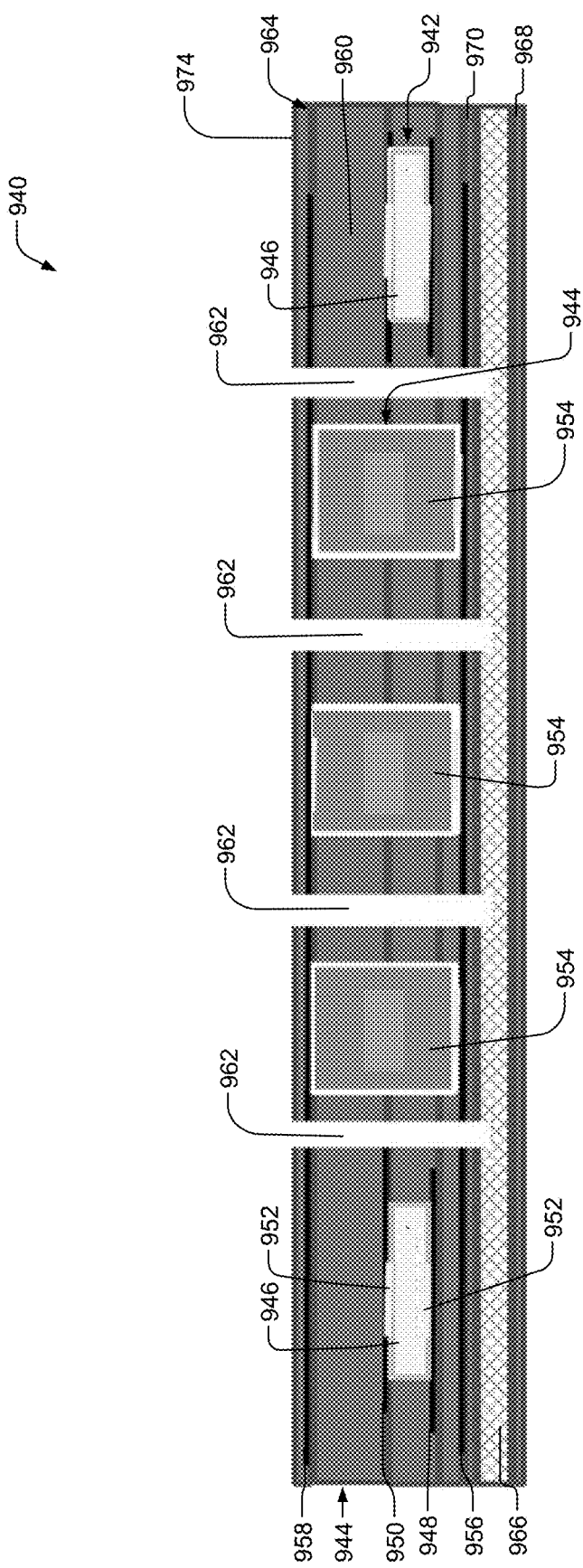
FIG. 14 shows an example seat climate control system constructed according the method of FIG. 15.
Figure 15:
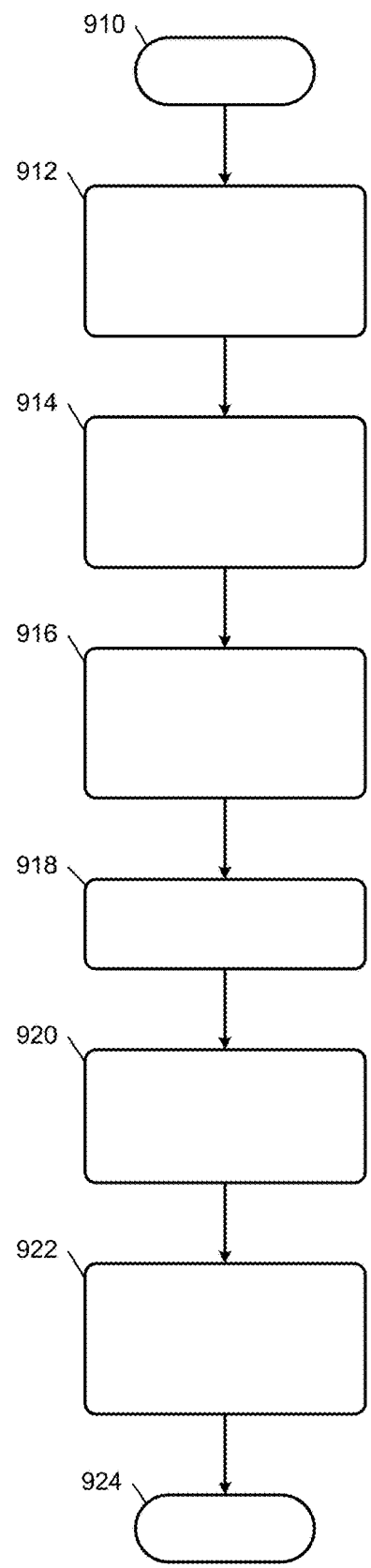
FIG. 15 shows a flowchart illustrating another example method of manufacturing a seat climate control system according to the principles of the present disclosure; and In the drawings, reference numbers may be reused to identify similar and/or identical elements.

FIG. 14 shows a seat climate control system 940 manufactured according to the method of FIG. 15. The seat climate control system 940 includes a sensor sub-assembly 942, a TED sub-assembly 944, and a urethane body 960. The sensor sub-assembly 942 includes a plurality of sensors 946, which may be pressure sensors, bonded between a bottom sensor circuit 948 and a top sensor circuit 950 with conductive adhesive 952. The bottom sensor circuit 948, the top sensor circuit 950, and/or the conductive adhesive 952 may also be included in the sensor sub-assembly 942.

The TED sub-assembly 944 includes a plurality of TEDs 954 bonded between a bottom TED circuit 956 and a top TED circuit 958 with conductive adhesive 952. The bottom TED circuit 956, the top TED circuit 958, and the conductive adhesive 952 may also be included in the TED sub-assembly 944. The sensor sub-assembly 942 is disposed interstitially with respect to the TED sub-assembly 944.

The urethane body 960 includes a plurality of airflow channels 962. The urethane body 960 surrounds the sensor and TED sub-assemblies 942, 944 to form a component sub-assembly 964. An airflow chamber 966 including a lower insulation layer 968 and an upper insulation layer 970 is bonded to a bottom surface 972 of the component sub-assembly 964. The upper layer 970 of the airflow chamber 966 has a plurality of openings that place the airflow chamber 966 in fluid communication with the airflow channels 962. The airflow channels 962 extend through a top surface 974 of the seat climate control system 940 and to the airflow chamber 966.

Referring to FIG. 15, a method of manufacturing the seat cushion 940 of FIG. 14 is provided. The method starts at 910. At 912, the top and bottom sensor circuits 950, 948 and the top and bottom TED circuits 958, 956 are printed. At 914, the sensors 946 are bonded between the bottom sensor circuit 948 and the top sensor circuit 950 to form the sensor sub-assembly 942. At 916, the TEDs 954 are bonded between the bottom TED circuit 956 and the top TED circuit 958 to form the TED sub-assembly 944.

At 918, the sensor sub-assembly 942 and TED sub-assembly 944 are placed into a mold having the negative geometry of the component sub-assembly 964. The mold may be configured to created additional features such as airflow channels. The sensor circuits 948, 950 may be disposed interstitially with respect to the TED circuits 956, 958. At 920, urethane is poured around the sensor and TED sub-assemblies 942, 944 to form the component sub-assembly 964. At 922, the airflow chamber 966, which may include the upper and lower insulation layers 970, 968, is bonded to the bottom of the component assembly 964 to form a seat climate control system 940. The method ends at 924.

Although each of the foregoing methods includes both sensors and TEDs, other components and combinations of components are contemplated within the scope of the present disclosure. By way of non-limiting example, the above methods may be used to manufacture a seat climate control system having TEDs but no sensors, or a seat climate control system having a temperature sensor and a TED but no pressure sensors.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a climate control circuit that, based on at least one of a user input and a first input from a temperature sensor that measures a temperature of a seat of a vehicle, generates one of (i) a heating command signal indicating an instruction to heat the seat and (ii) a cooling command signal indicating an instruction to cool the seat; and
a thermal device control circuit that, in response to one of the heating command signal and the cooling command signal, controls at least one TED to one of heat and cool the seat based on a second input from at least one sensor that measures at least one of a pressure applied to the seat, a force applied to the seat, and a strain within the seat, wherein the thermal device control circuit selects a magnitude of power supplied to the at least one TED from at least two nonzero power levels based on the second input from the at least one sensor.

2. The system of claim 1 wherein the thermal device control circuit determines a duty cycle of power supplied to the at least one TED based on at least one of the user input and the first input from the temperature sensor.

3. The system of claim 2 wherein:
the at least one sensor includes a first sensor that measures a first pressure applied to the seat and a second sensor that measures a second pressure applied to the seat; and
the at least one TED includes a first TED that is disposed between the first and second sensors.

4. The system of claim 3 wherein the thermal device control circuit determines the magnitude of power supplied to the at least one TED based on the first and second pressures.

5. The system of claim 4 wherein the thermal device control circuit sets the magnitude of power supplied to the at least one TED equal to zero when each of the first and second pressures are less than a predetermined value.

6. The system of claim 4 further comprising a compensation factor circuit that determines a first compensation factor associated with the first TED based on the first and second pressures, a first distance between the first TED and the first sensor, and a second distance between the first TED and the second sensor, wherein:

the first compensation factor is an estimated pressure at the first TED; and the thermal device control circuit determines the magnitude of power supplied to the first TED based on the first compensation factor.

7. The system of claim 6 wherein:

the at least one TED further includes a second TED;

the compensation factor circuit determines a second compensation factor associated with the second TED; and the thermal device control circuit determines the magnitude of power supplied to the first TED based on the first and second compensation factors.

8. The system of claim 7 wherein the thermal device control circuit:

determines a maximum value of the first and second compensation factors;

determines a minimum value of the first and second compensation factors; and determines the magnitude of power supplied to the first TED based on the first compensation factor, the maximum value, and the minimum value.

9. The system of claim 8 wherein the compensation factor circuit sets the first compensation factor equal to the maximum value of the first and second compensation factors when each of the first and second pressures is less than a predetermined value.

10. The system of claim 1 wherein the thermal device control circuit adjusts the magnitude of power supplied to the at least one TED inversely proportional to the second input from the at least one sensor.

11. A system comprising:

a climate control circuit that, based on at least one of a user input and a first input from a temperature sensor that measures a temperature of a seat of a vehicle, generates one of (i) a heating command signal indicating an instruction to heat the seat and (ii) a cooling command signal indicating an instruction to cool the seat; and a thermal device control circuit that, in response to one of the heating command signal and the cooling command signal, controls a blower to one of heat and cool the seat based on a second input from at least one sensor that measures at least one of a pressure applied to the seat, a force applied to the seat, and a strain within the seat, wherein the thermal device control circuit adjusts an amount of power supplied to the blower between at least two nonzero power levels in direct proportion to the at least one of the pressure applied to the seat, the force applied to the seat, and the strain within the seat.

12. A method for heating or cooling a seat of a vehicle, the method comprising:

based on at least one of a user input and a first input from a temperature sensor that measures a temperature of the seat, generating one of (i) a heating command signal indicating an instruction to heat the seat and (ii) a cooling command signal indicating an instruction to cool the seat;

in response to one of the heating command signal and the cooling command signal, controlling at least one TED to one of heat and cool the seat based on a second input from at least one sensor that measures at least one of a pressure applied to the seat, a force applied to the seat, and a strain within the seat; and selecting a magnitude of power supplied to the at least one TED from at least two nonzero power levels based on the second input from the at least one sensor.

13. The method of claim 12 further comprising determining a duty cycle of power supplied to the at least one TED based on at least one of the user input and the first input from the temperature sensor.

14. The method of claim 13 wherein:

the at least one sensor includes a first sensor that measures a first pressure applied to the seat and a second sensor that measures a second pressure applied to the seat; and the at least one TED includes a first TED that is disposed between the first and second sensors.

15. The method of claim 14 further comprising determining the magnitude of power supplied to the at least one TED based on the first and second pressures.

16. The method of claim 15 further comprising setting the magnitude of power supplied to the at least one TED equal to zero when each of the first and second pressures are less than a predetermined value.

17. The method of claim 15 further comprising:

determining a first compensation factor associated with the first TED based on the first and second pressures, a first distance between the first TED and the first sensor, and a second distance between the first TED and the second sensor, wherein the first compensation factor is an estimated pressure at the first TED; and determining the magnitude of power supplied to the first TED based on the first compensation factor.

18. The method of claim 17 wherein the at least one TED further includes a second TED, the method further comprising:

determining a second compensation factor associated with the second TED; and determining the magnitude of power supplied to the first TED based on the first and second compensation factors.

19. The method of claim 18 further comprising:

determining a maximum value of the first and second compensation factors;

determining a minimum value of the first and second compensation factors; and determining the magnitude of power supplied to the first TED based on the first compensation factor, the maximum value, and the minimum value.

20. The method of claim 19 further comprising setting the first compensation factor equal to the maximum value of the first and second compensation factors when each of the first and second pressures is less than the predetermined value.

21. The method of claim 12 further comprising adjusting the magnitude of power supplied to the at least one TED inversely proportional to the second input from the at least one sensor.

22. A method for heating or cooling a seat of a vehicle, the method comprising:

based on at least one of a user input and a first input from a temperature sensor that measures a temperature of the seat, generating one of (i) a heating command signal indicating an instruction to heat the seat and (ii) a cooling command signal indicating an instruction to cool the seat;

in response to one of the heating command signal and the cooling command signal, controlling a blower to one of heat and cool the seat based on a second input from at least one sensor that measures at least one of a pressure applied to the seat, a force applied to the seat, and a strain within the seat; and adjusting an amount of power supplied to the blower between at least two nonzero power levels in direct proportion to the at least one of the pressure applied to the seat, the force applied to the seat, and the strain within the seat.

23. A climate control system for a seat of a vehicle, the climate control system comprising:
- a plurality of TEDs that, when supplied with a voltage, are configured to generate a difference between a first temperature of a first side of the seat and a second temperature of a second side of the seat; and
- a plurality of sensors that are configured to measure at least one of a pressure applied to the seat, a force applied to the seat, and a strain within the seat, wherein at least one of the plurality of TEDs is located between at least two of the plurality of sensors, wherein:
- the plurality of TEDs are arranged in a first matrix having first rows and first columns;
- the plurality of sensors are arranged in second matrix having second rows aligned with the first rows and second columns aligned with the first columns; and
- each of the plurality of TEDs is located between at least two of the plurality of sensors.

24. The climate control system of claim 23 further comprising:
- a circuit configured to supply power to the plurality of TEDs and the plurality of sensors; and
- a blower configured to blow air past the plurality of TEDs and the plurality of sensors and through the seat.

* * * * *